United States Patent
Lin et al.

(10) Patent No.: US 12,508,225 B2
(45) Date of Patent: Dec. 30, 2025

(54) LIPID COMPOUND AND USE THEREOF IN DELIVERY OF NUCLEIC ACID

(71) Applicant: BEIJING TRICISIONBIO THERAPEUTICS INC., Beijing (CN)

(72) Inventors: Yaoxin Lin, Beijing (CN); Chengqiang Gao, Beijing (CN); Shiyou Li, Beijing (CN); Hao Wang, Beijing (CN); Lei Wu, Beijing (CN); Qi Xin, Beijing (CN)

(73) Assignee: BEIJING TRICISIONBIO THERAPEUTICS INC., Beijing (CN)

( * ) Notice: Subject to any disclaimer, the term of this patent is extended or adjusted under 35 U.S.C. 154(b) by 240 days.

(21) Appl. No.: 18/558,335

(22) PCT Filed: May 23, 2022

(86) PCT No.: PCT/CN2022/094532
§ 371 (c)(1),
(2) Date: Oct. 31, 2023

(87) PCT Pub. No.: WO2022/247801
PCT Pub. Date: Dec. 1, 2022

(65) Prior Publication Data
US 2024/0252434 A1    Aug. 1, 2024

(30) Foreign Application Priority Data
May 28, 2021 (CN) .......................... 202110592439.8

(51) Int. Cl.
| | |
|---|---|
| *A61K 9/1271* | (2025.01) |
| *A61K 9/51* | (2006.01) |
| *C07C 213/04* | (2006.01) |
| *C07C 215/24* | (2006.01) |

(52) U.S. Cl.
CPC .......... *A61K 9/1271* (2013.01); *A61K 9/5123* (2013.01); *C07C 213/04* (2013.01); *C07C 215/24* (2013.01)

(58) Field of Classification Search
CPC ............................. C07C 29/147; C07C 33/02
See application file for complete search history.

(56) References Cited

U.S. PATENT DOCUMENTS

| | | |
|---|---|---|
| 2012/0295832 A1 | 11/2012 | Constien et al. |
| 2017/0137409 A1 | 5/2017 | Brown |
| 2019/0298657 A1 | 10/2019 | Martini et al. |
| 2021/0032192 A1 | 2/2021 | Angel et al. |
| 2021/0269570 A1 | 9/2021 | Rossi |

FOREIGN PATENT DOCUMENTS

| | | |
|---|---|---|
| CN | 102665761 A | 9/2012 |
| CN | 107427531 A | 12/2017 |
| CN | 107848988 A | 3/2018 |
| CN | 107922364 A | 4/2018 |
| EP | 3662913 A1 | 6/2020 |
| JP | 2020512272 A | 4/2020 |
| WO | 2010053572 A2 | 5/2010 |
| WO | 2016189532 A1 | 12/2016 |
| WO | 2017205566 A1 | 11/2017 |
| WO | 2018062413 A1 | 4/2018 |
| WO | 2018081480 A1 | 5/2018 |
| WO | 2018236849 A1 | 12/2018 |
| WO | 2019089828 A1 | 5/2019 |
| WO | 2020257611 A1 | 12/2020 |
| WO | 2021030701 A1 | 2/2021 |
| WO | 2021102411 A1 | 5/2021 |
| WO | 2022016089 A2 | 1/2022 |
| WO | 2022063350 A1 | 3/2022 |

OTHER PUBLICATIONS

Yu, Bo et al., "Lipid Nanoparticles for Hepatic Delivery of Small Interfering RNA", Biomaterials, vol. 33, No. 25, Sep. 2012, pp. 5924-5934.
Ramishetti, Srinivas et al.; "A Combinatorial Library of Lipid Nanoparticles for RNA Delivery to Leukocytes"; Advanced Materials; vol. 32, No. 1906128, Jan. 30, 2020; pp. 1-8.
Fenton, Owen S. et al.; "Bioinspired Alkenyl Amino Alcohol Ionizable Lipid Materials for Highly Potent in vivo mRNA Delivery Highly Potent in vivo mRNA Delivery"; Adv Mater.; vol. 28, No. 15; Apr. 20, 2016; pp. 2939-2943.

*Primary Examiner* — Genevieve S Alley
(74) *Attorney, Agent, or Firm* — NKL Law; Allen Xue

(57) ABSTRACT

Provided are an ionizable lipid compound with an adjacent cis-double bond structure, a preparation method therefor, and the use thereof in the delivery of an active therapeutic agent (e.g., a nucleic acid). The ionizable lipid compound can provide a higher encapsulation rate of active substances and a better cell or in vivo transfection rate, and is particularly suitable for preparing nanoparticles with a solid structure.

7 Claims, 4 Drawing Sheets

LIPID COMPOUND AND USE THEREOF IN DELIVERY OF NUCLEIC ACID

CROSS-REFERENCE TO RELATED APPLICATIONS

The present application is a U.S. national stage entry of PCT international application No. PCT/CN2022/094532, filed on May 23, 2022, which claims priority to the prior application with the Chinese patent application No. 202110592439.8 and entitled "COMPOUND AND USE THEREOF IN DELIVERY OF NUCLEIC ACID" filed to the China National Intellectual Property Administration on May 28, 2021, the content of each is incorporated herein by reference in its entirety.

TECHNICAL FIELD

The present invention belongs to the technical field of medicinal compounds, and particularly relates to an ionizable lipid compound, a preparation method therefor, and use thereof in the delivery of an active therapeutic agent (e.g., a nucleic acid).

BACKGROUND

Nucleic acids include small interfering RNA (siRNA), messenger RNA (mRNA), microRNA (miRNA), antisense oligonucleotides (ASOs), ribozymes, plasmids, and immunostimulatory nucleic acids, which function through various mechanisms. Taking mRNA as an example, mRNA is a type of RNA that transports genetic information from DNA to ribosomes in the cytoplasm for protein translation. It does not need to enter the nucleus, so it does not bring the risk of genetic mutation, and can be used to achieve the expression of specific cellular products. These nucleic acids are useful in the treatment of diseases associated with deficiencies in proteins or enzymes. However, nucleic acids will have many problems in the therapeutic environment. For example, mRNA, which has a single-stranded structure, is very unstable and is degraded by nucleases soon after entering the body. In addition, mRNA has a large molecular weight and carries a large number of negative charges, making it difficult to cross negatively charged cell membranes into target cells. Therefore, how to effectively deliver mRNA to cells is a technical key to achieving its in vivo applications. Similar problems exist in various therapeutic nucleic acids.

In gene therapy, ionizable lipid compounds have been proven to be excellent delivery vectors for nucleic acids for the treatment of various diseases. An amino group of the ionizable lipid compound can be protonated to form a positively charged headgroup under suitable acidic conditions, the tail of which is composed of a hydrophobic carbon chain. The charged moiety is used to electrostatically bind to negatively charged RNA, while the hydrophobic tail enables it to self-assemble into a lipophilic particle. Lipid nanoparticles (LNPs) formed by self-assembly of the ionizable lipid compounds in combination with other three or four lipids such as distearoyl phosphatidylcholine (DSPC) or dioleoyl-phosphatidylethanolamine (DOPE), cholesterol (CHOL), and PEGylated lipids [1,2-dimyristyl-rac-glycero-3-methoxypolyethylene glycol 2000 (DMG-PEG2000) or distearoyl phosphatidylethanolamine-polyethylene glycol 2000 (DSPE-PEG2000)] are used to deliver nucleic acids, can protect the nucleic acids from degradation by nucleases, and promote cellular uptake. At present, the ionizable lipid compounds have made great progress in the delivery of nucleic acids, but there is still a problem of low delivery efficiency, which is one of bottleneck problems restricting the development of the industry.

SUMMARY

The present invention provides a novel ionizable lipid compound that can be used to deliver a bioactive molecule (e.g., mRNA, siRNA, micRNA, a protein, a polypeptide, etc.). In view of the fact that an amino group structure can be protonated to form a positively charged cationic group, the ionizable lipid compound of the present invention is particularly suitable for delivering a negatively charged active substance, such as DNA, RNA, or other nucleotide molecules.

The present invention further provides a bioactive substance delivery system comprising the ionizable lipid compound, wherein the delivery system may be microparticles, nanoparticles, liposomes, lipid nanoparticles, or microbubbles. In one embodiment of the present invention, the delivery system is lipid nanoparticles. Such lipid nanoparticles can efficiently deliver bioactive substances (e.g., mRNA) to cells, tissues, or organs, thereby achieving efficient regulation of the bioactive substances. In the present invention, the ionizable lipid compound is combined with a bioactive substance delivered to a targeted cell or an individual, or other substances further included (e.g., other anionic, cationic, or ionizable lipid compounds, synthetic or natural polymers, surfactants, cholesterol, carbohydrates, proteins, phospholipids, etc.) to form microparticles, nanoparticles, liposomes, lipid nanoparticles, or microbubbles. The bioactive substance can be in gas, liquid, or solid form, and can be a polynucleotide, a protein, a peptide, or a small molecule. In the present invention, the delivery system can then optionally be combined with a pharmaceutical excipient to form a pharmaceutical composition. The present invention further provides a method for synthesizing these novel ionizable lipid compounds.

The present invention further provides use of the novel ionizable lipid compound in preparing a bioactive substance delivery system. The delivery system may be microparticles, nanoparticles, liposomes, lipid nanoparticles, or microbubbles. In one embodiment of the present invention, the delivery system is lipid nanoparticles.

The ionizable lipid compound of the present invention has a structure

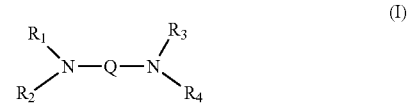

(I)

of formula I, wherein:
Q is a substituted or unsubstituted linear C2-20 alkylene, wherein one or more C atoms of the alkylene are optionally substituted by heteroatom(s) independently selected from O, S, and N; or Q is a substituted or unsubstituted saturated or unsaturated 4- to 6-membered ring, wherein ring atoms of the 4- to 6-membered ring optionally comprise one or more heteroatoms independently selected from O, S, and N; a substituent group for the substitution is selected from halogen, —OH, linear or branched C1-20 alkyl, linear or branched C1-20 alkoxy, linear or branched C2-20 alkenyl, linear or branched C2-20 alkynyl, —CH₂CH(OH)R₅, and

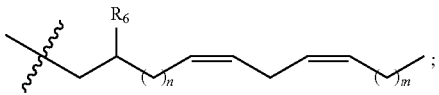

R₁, R₂, R₃, and R₄ can be identical or different and are each independently selected from hydrogen, substituted or unsubstituted linear or branched C1-30 alkyl, substituted or unsubstituted linear or branched C2-30 alkenyl, substituted or unsubstituted linear or branched C2-30 alkynyl, and —CH₂CH(OH)R₅, wherein one or more C atoms of the alkyl, alkenyl, or alkynyl are optionally substituted by heteroatom(s) independently selected from O, S, and N; a substituent group for the substitution is selected from halogen, —OH, linear or branched C1-10 alkyl, and linear or branched C1-10 alkoxy;

provided that at least one of R₁, R₂, R₃, and R₄ is

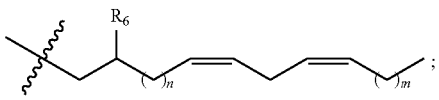

R₅ is selected from hydrogen, substituted or unsubstituted linear or branched C1-30 alkyl, substituted or unsubstituted linear or branched C2-30 alkenyl, and substituted or unsubstituted linear or branched C2-30 alkynyl, wherein one or more C atoms of the alkyl, alkenyl, or alkynyl are optionally substituted by heteroatom(s) independently selected from O, S, and N; a substituent group for the substitution is selected from halogen, —OH, linear or branched C1-10 alkyl, and linear or branched C1-10 alkoxy; R₆ is selected from hydrogen, C1-3 alkyl, C1-3 alkoxy, and —OH;

n is selected from integers from 1 to 8, m is selected from integers from 0 to 8, and n and m are independent of each other and can be identical or different;

when at least two of R₁, R₂, R₃, and R₄ are

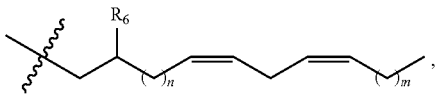

n and m in each of the groups are independent of each other and can be identical or different.

In a preferred embodiment of the present invention, Q is a substituted or unsubstituted linear C2-20 alkylene, wherein one or more C atoms of the alkylene are optionally substituted by heteroatom(s) independently selected from O, S, and N;

preferably, Q is

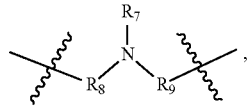

wherein R₈ and R₉ are each independently selected from substituted or unsubstituted linear C1-10 alkylene, wherein one or more C atoms of the alkylene are optionally substituted by heteroatom(s) independently selected from O, S, and N; R₇ is hydrogen, halogen, —OH, linear or branched C1-20 alkyl, linear or branched C2-20 alkenyl, linear or branched C2-20 alkynyl, —CH₂CH(OH)R₅, or

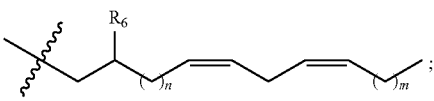

a substituent group for the substitution is halogen, —OH, linear or branched C1-10 alkyl, or linear or branched C1-10 alkoxy;

preferably, Q is

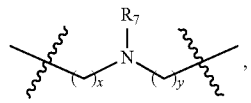

wherein x and y can be identical or different and are independently selected from integers from 1 to 8; R₇ is as defined above; preferably, x and y are identical or different and are selected from integers from 1 to 3, such as 1, 2, or 3; preferably, R₇ is linear or branched C1-4 alkyl, such as methyl, ethyl, n-propyl, n-butyl, etc.

In some embodiments of the present invention, the saturated or unsaturated 4- to 6-membered ring is piperazinyl or cyclohexyl.

In a preferred embodiment of the present invention, R₆ is —OH.

In a preferred embodiment of the present invention, n is selected from integers from 4 to 8, and m is selected from integers from 4 to 8.

In a preferred embodiment of the present invention, the compound of formula I is a compound of the following formula A, B, C, or D:

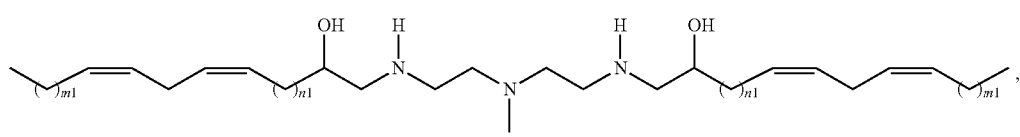

A wherein each n₁ is independent and can be identical or different, and each n₁ is selected from integers from 1 to 8; each m₁ is independent and can be identical or different, and each m₁ is selected from integers from 0 to 8; preferably, each n₁ is selected from integers from 4 to 8, and each m₁ is selected from integers from 4 to 8; preferably, each $n_1$ is identical, and each $m_1$ is identical.

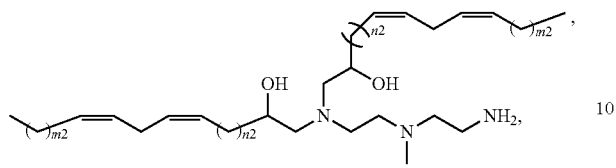

B wherein each $n_2$ is independent and can be identical or different, and each $n_2$ is selected from integers from 1 to 8; each $m_2$ is independent and can be identical or different, and each $m_2$ is selected from integers from 0 to 8; preferably, each $n_2$ is selected from integers from 4 to 8, and each $m_2$ is selected from integers from 4 to 8; preferably, each $n_2$ is identical, and each $m_2$ is identical.

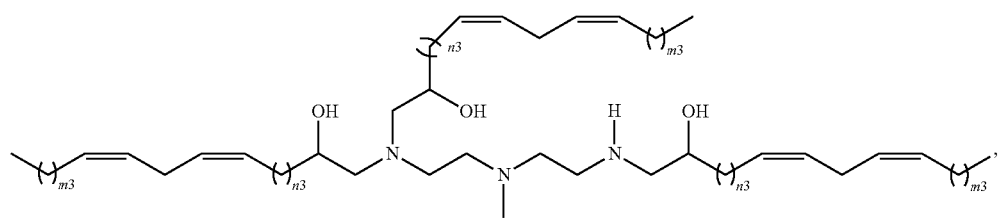

C wherein each $n_3$ is independent and can be identical or different, and each $n_3$ is selected from integers from 1 to 8; each $m_3$ is independent and can be identical or different, and each $m_3$ is selected from integers from 0 to 8; preferably, each $n_3$ is selected from integers from 4 to 8, and each $m_3$ is selected from integers from 4 to 8; preferably, each $n_3$ is identical, and each $m_3$ is identical.

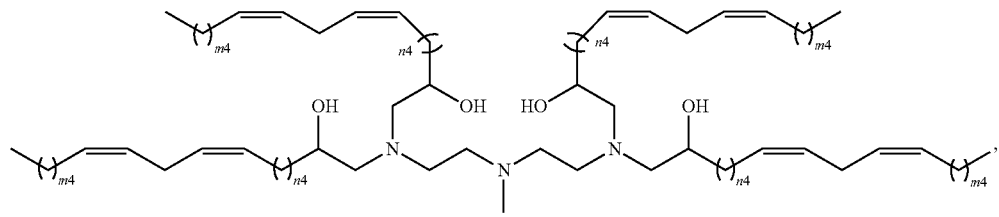

D wherein each $n_4$ is independent and can be identical or different, and each $n_4$ is selected from integers from 1 to 8; each $m_4$ is independent and can be identical or different, and each $m_4$ is selected from integers from 0 to 8; preferably, each $n_4$ is selected from integers from 4 to 8, and each $m_4$ is selected from integers from 4 to 8; preferably, each $n_4$ is identical, and each $m_4$ is identical.

In some embodiments of the present invention, the compound of formula I is selected from the following compounds as shown in Table 1:

TABLE 1
| No. | Structural formula |
|---|---|
| I-1 | 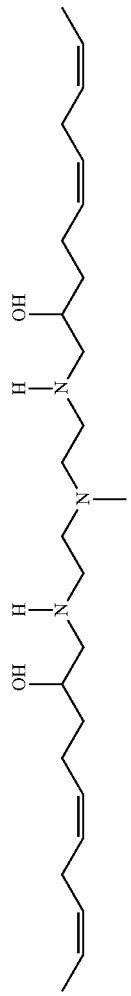 |
| I-2 | 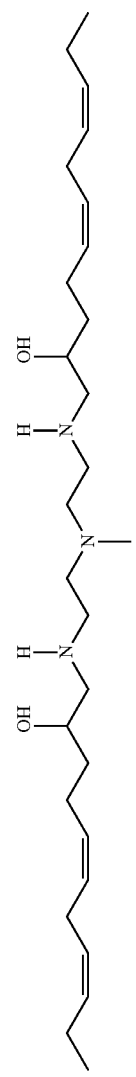 |
| I-3 | 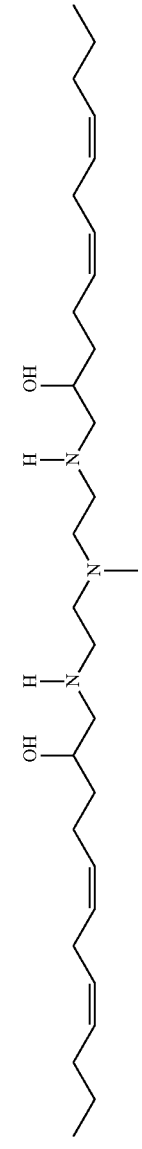 |
| I-4 | 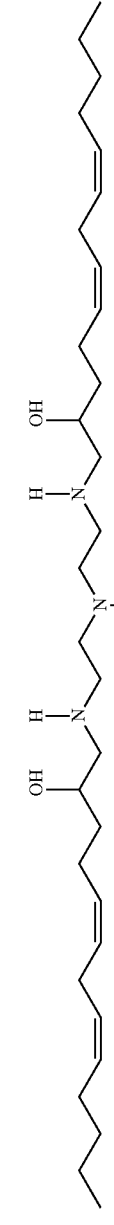 |
| I-5 | 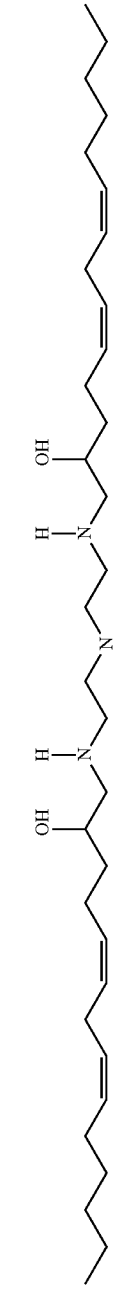 |
| I-6 | 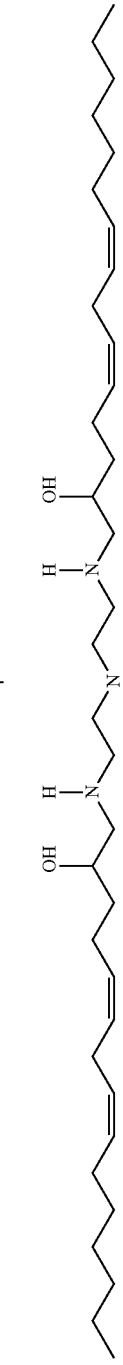 |
| I-7 | 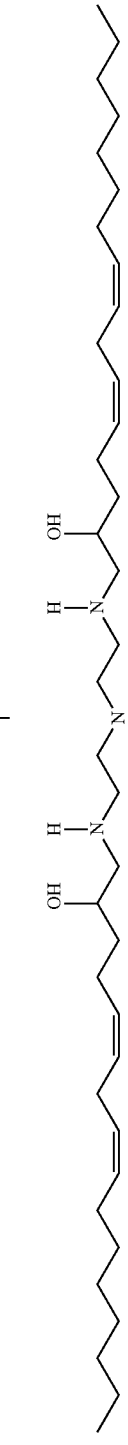 |

TABLE 1-continued

| No. | Structural formula |
|---|---|
| I-8 | |
| I-9 | |
| I-10 | |
| I-11 | |
| I-12 | |
| I-13 | |
| I-14 | |

TABLE 1-continued

| No. | Structural formula |
|-----|-------------------|
| I-15 | |
| I-16 | |
| I-17 | |
| I-18 | |
| I-19 | |
| I-20 | |
| I-21 | |

TABLE 1-continued

| No. | Structural formula |
|---|---|
| I-22 | |
| I-23 | |
| I-24 | |
| I-25 | |
| I-26 | |
| I-27 | |
| I-28 | |

TABLE 1-continued

| No. | Structural formula |
|---|---|
| I-29 | |
| I-30 | |
| I-31 | |
| I-32 | |
| I-33 | |
| I-34 | |
| I-35 | |

TABLE 1-continued

| No. | Structural formula |
|---|---|
| I-36 | |
| I-37 | |
| I-38 | |
| I-39 | |
| I-40 | |
| I-41 | |
| I-42 | |

TABLE 1-continued

| No. | Structural formula |
|---|---|
| I-43 | |
| I-44 | |
| I-45 | |
| I-46 | |
| I-47 | |
| I-48 | |
| I-49 | |

TABLE 1-continued

| No. | Structural formula |
|---|---|
| I-50 | |
| I-51 | |
| I-52 | |
| I-53 | |
| I-54 | |
| I-55 | |
| I-56 | |

TABLE 1-continued
| No. | Structural formula |
|---|---|
| II-1 | 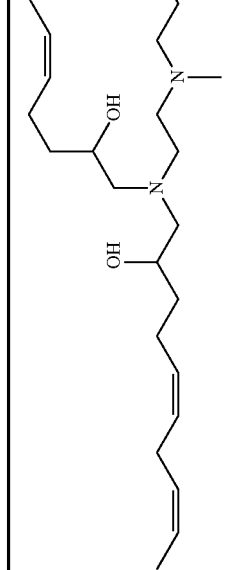 |
| II-2 | 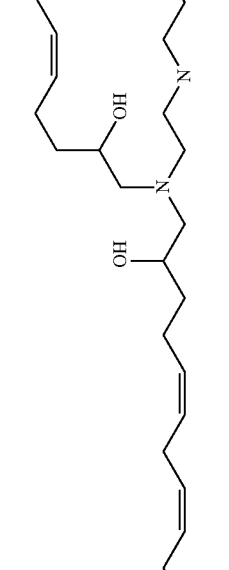 |
| II-3 | 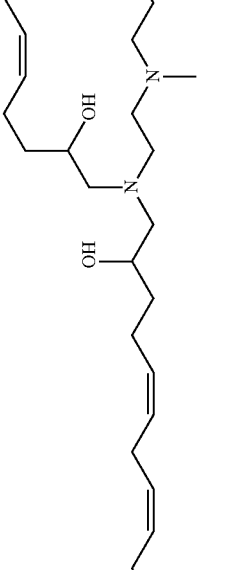 |
| II-4 | 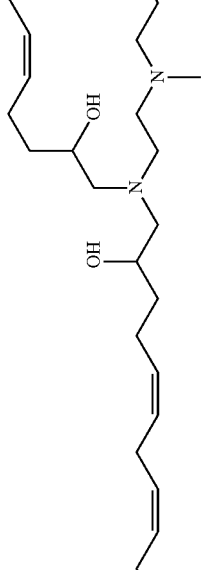 |

TABLE 1-continued
| No. | Structural formula |
|---|---|
| II-5 | 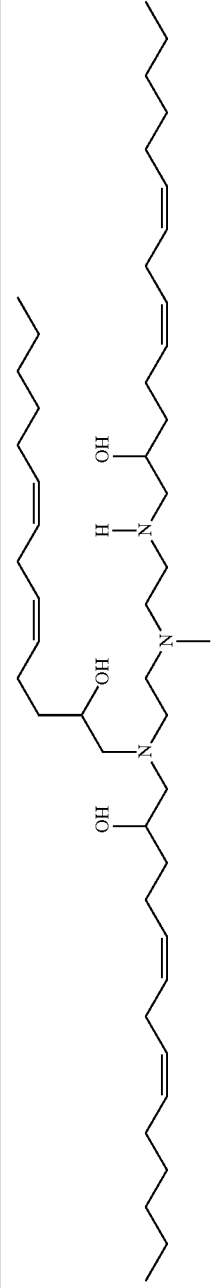 |
| II-6 | 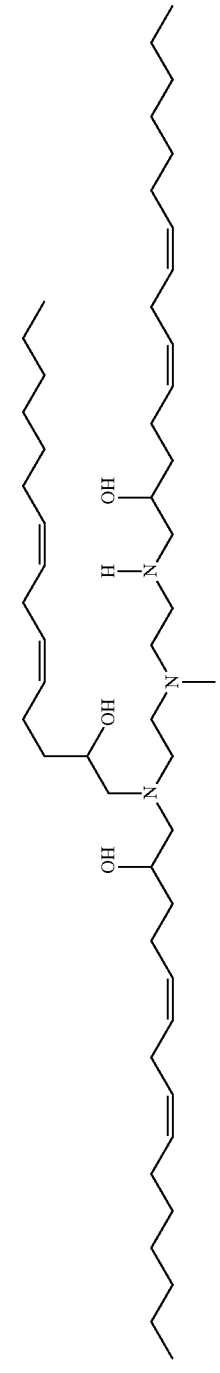 |
| II-7 | 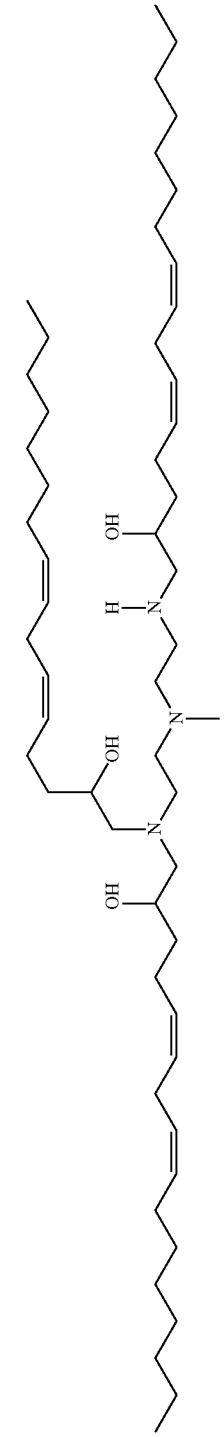 |
| II-8 | 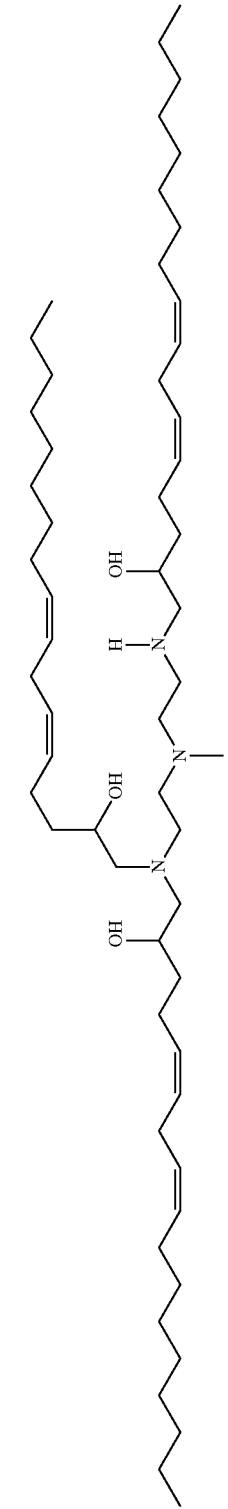 |

TABLE 1-continued
| No. | Structural formula |
|---|---|
| II-9 | 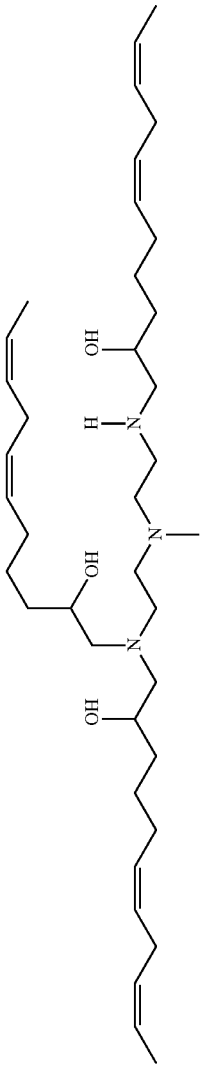 |
| II-10 | 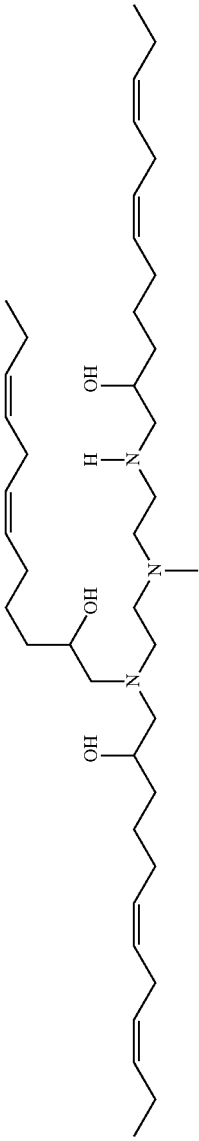 |
| II-11 | 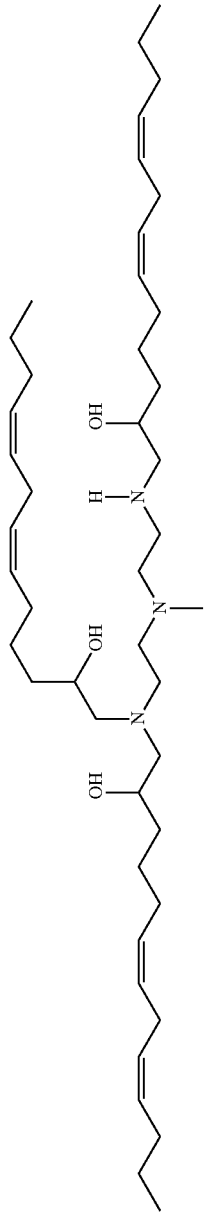 |
| II-12 | 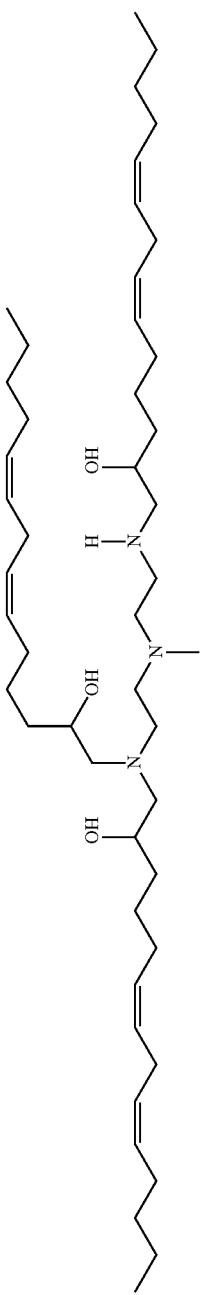 |

TABLE 1-continued

| No. | Structural formula |
|---|---|
| II-13 | |
| II-14 | |
| II-15 | |
| II-16 | |

TABLE 1-continued

| No. | Structural formula |
|---|---|
| II-17 | |
| II-18 | |
| II-19 | |
| II-20 | |

TABLE 1-continued
| No. | Structural formula |
|---|---|
| II-21 | 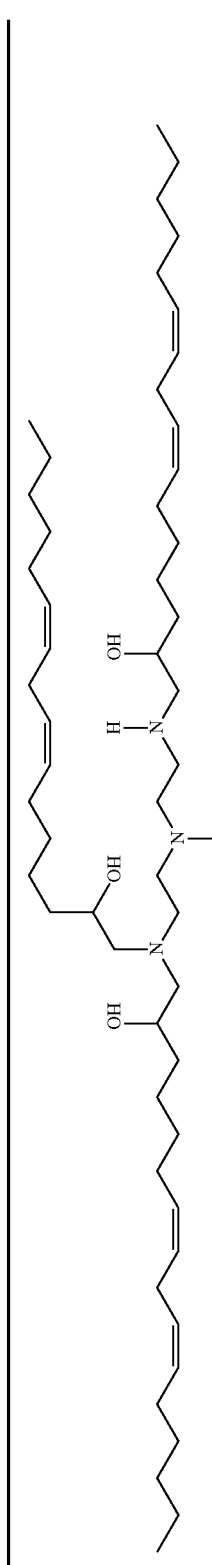 |
| II-22 | 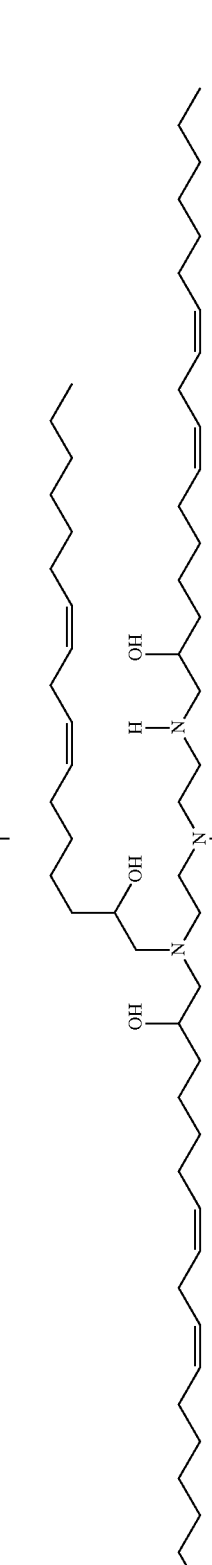 |
| II-23 | 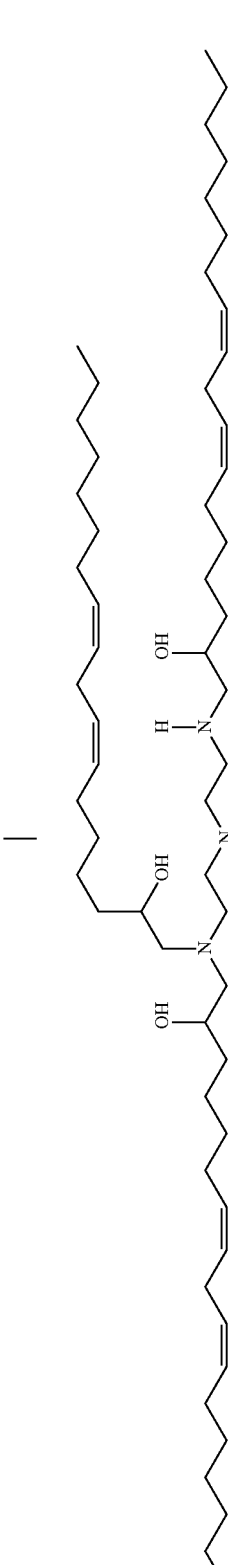 |
| II-24 | 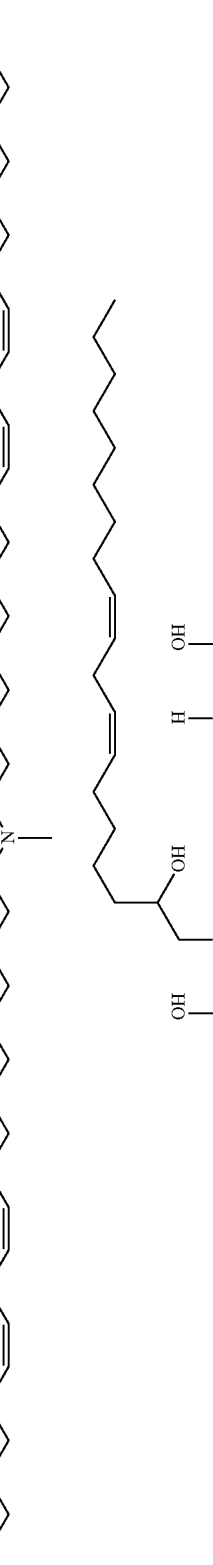 |

TABLE 1-continued
| No. | Structural formula |
|---|---|
| II-25 | 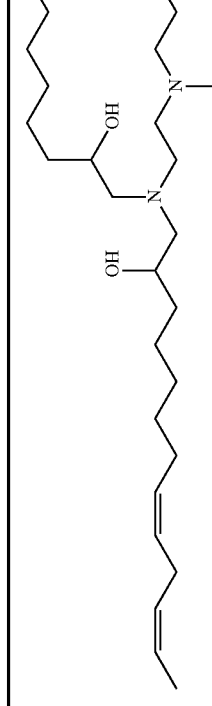 |
| II-26 | 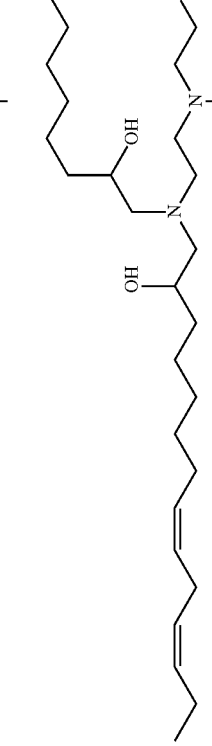 |
| II-27 | 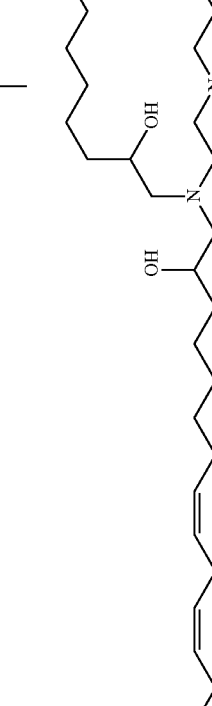 |
| II-28 | 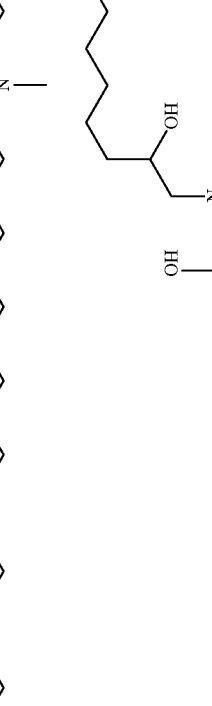 |

TABLE 1-continued
| No. | Structural formula |
|---|---|
| II-29 | 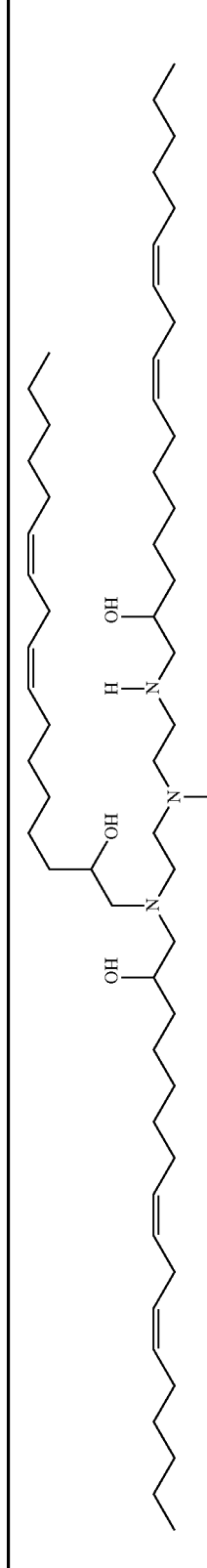 |
| II-30 | 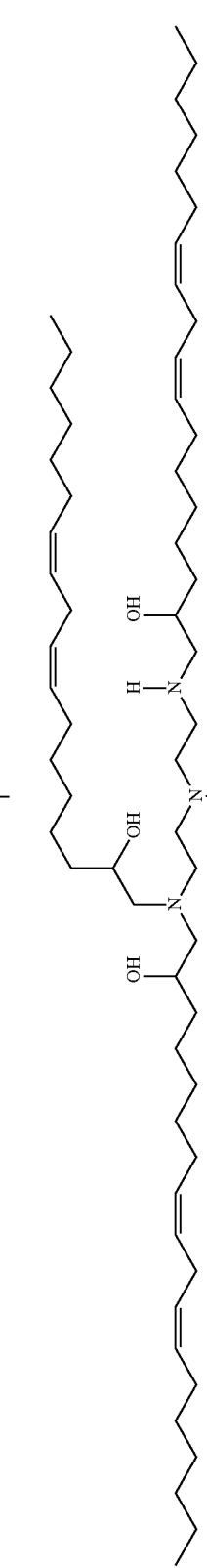 |
| II-31 | 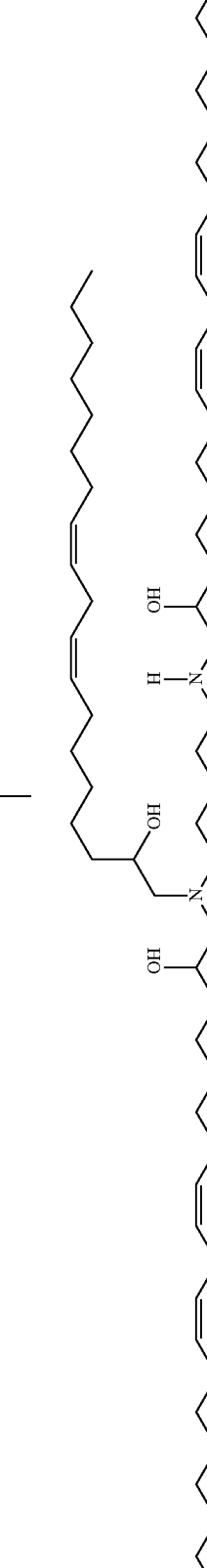 |
| II-32 | 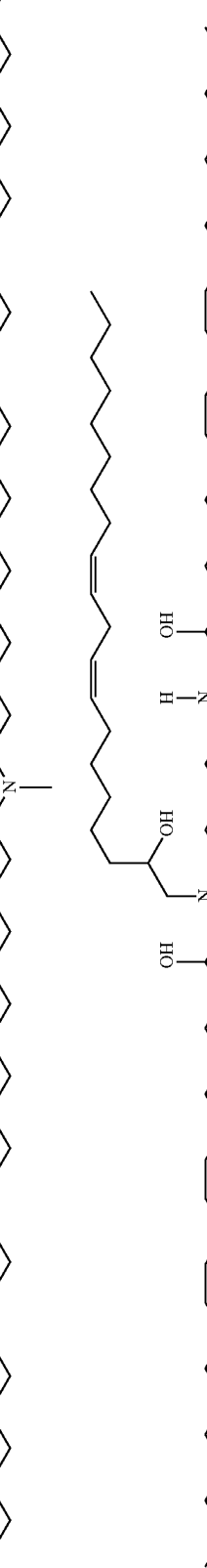 |

TABLE 1-continued

| No. | Structural formula |
|---|---|
| II-33 | |
| II-34 | |
| II-35 | |
| II-36 | |

TABLE 1-continued

| No. | Structural formula |
|---|---|
| II-37 | |
| II-38 | |
| II-39 | |
| II-40 | |
| II-41 | |

TABLE 1-continued

| No. | Structural formula |
|---|---|
| II-42 | |
| II-43 | |
| II-44 | |
| II-45 | |
| II-46 | |

TABLE 1-continued

| No. | Structural formula |
|---|---|
| II-47 | |
| II-48 | |
| II-49 | |
| II-50 | |
| II-51 | |

TABLE 1-continued
| No. | Structural formula |
|---|---|
| II-52 | 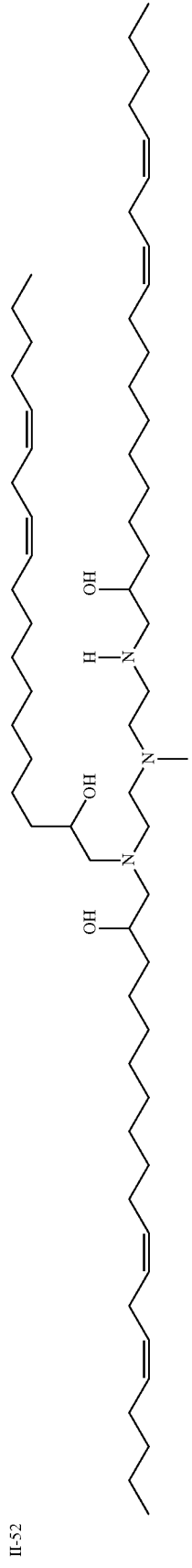 |
| II-53 | 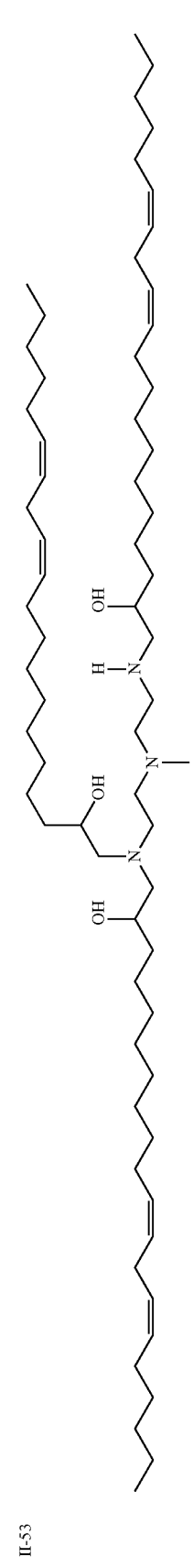 |
| II-54 | 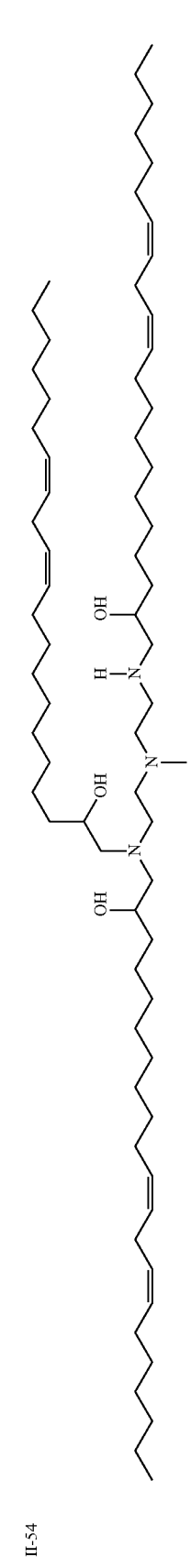 |
| II-55 | 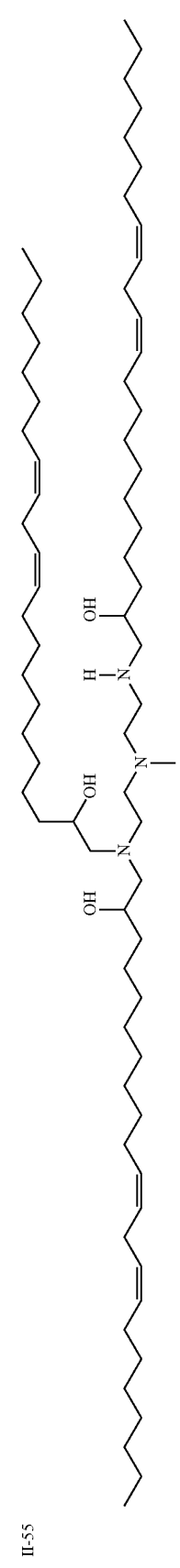 |
| II-56 | 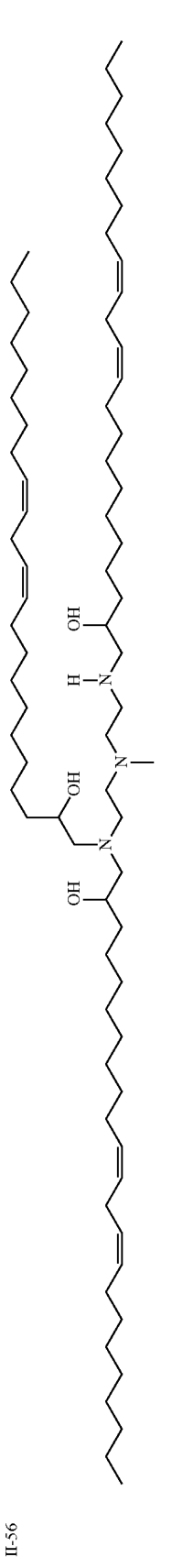 |

TABLE 1-continued

| No. | Structural formula |
|---|---|
| III-1 | |
| III-2 | |
| III-3 | |
| III-4 | |
| III-5 | |

TABLE 1-continued

| No. | Structural formula |
|---|---|
| III-6 | |
| III-7 | |
| III-8 | |
| III-9 | |

TABLE 1-continued

| No. | Structural formula |
|---|---|
| III-10 | |
| III-11 | |
| III-12 | |
| III-13 | |
| III-14 | |

TABLE 1-continued
| No. | Structural formula |
|---|---|
| III-15 | 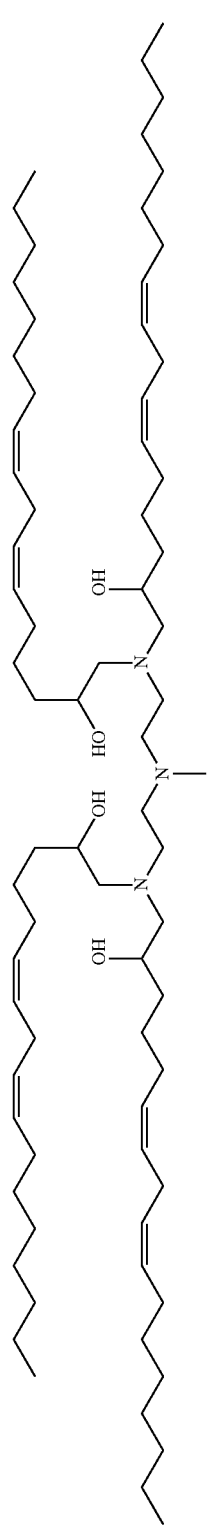 |
| III-16 | 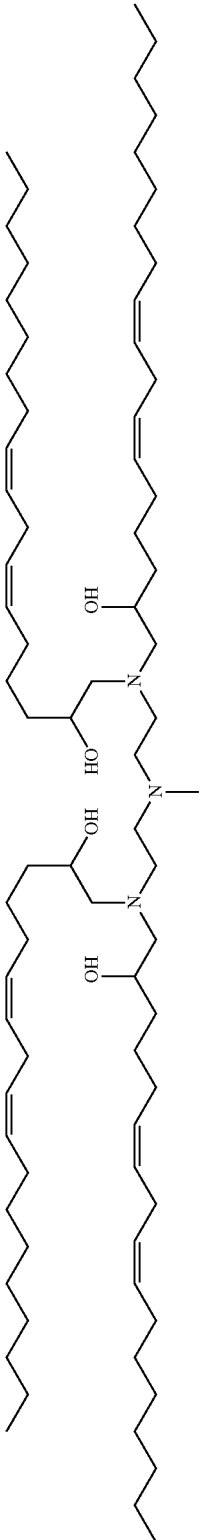 |
| III-17 | 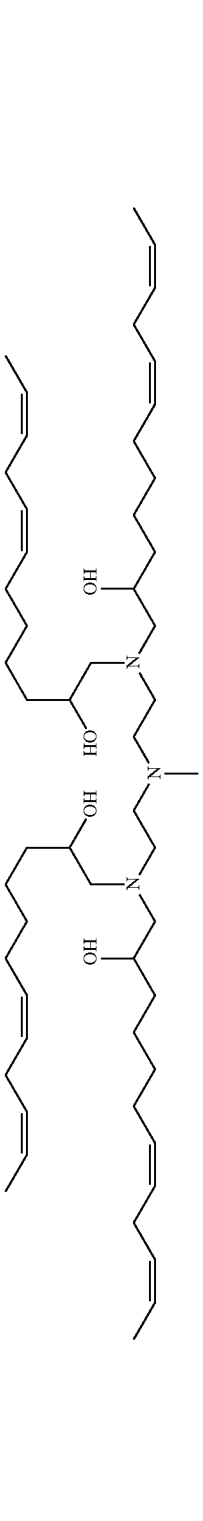 |
| III-18 | 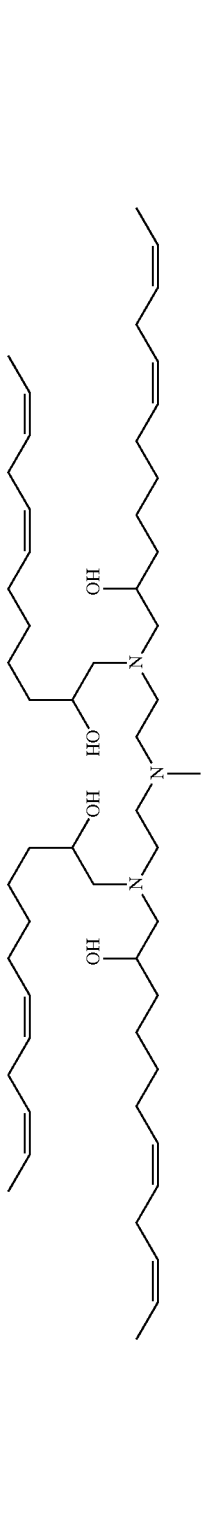 |

TABLE 1-continued

| No. | Structural formula |
|---|---|
| III-19 | |
| III-20 | |
| III-21 | |
| III-22 | |

TABLE 1-continued
| No. | Structural formula |
|---|---|
| III-23 | 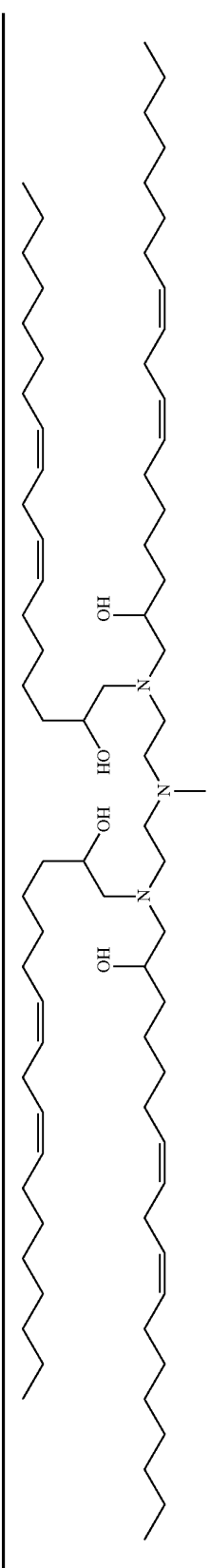 |
| III-24 | 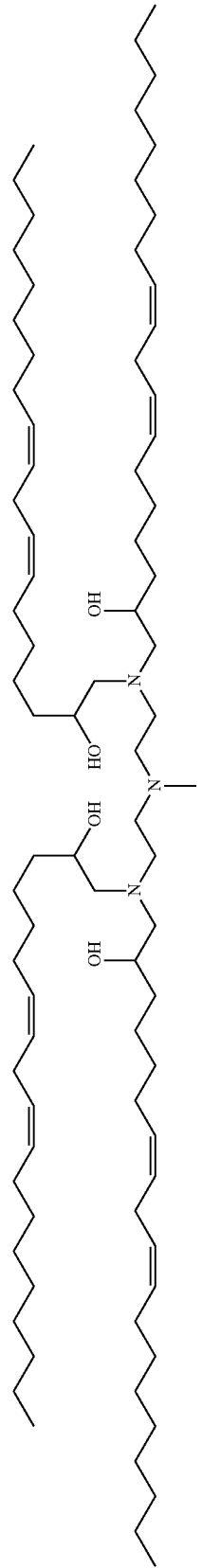 |
| III-25 | 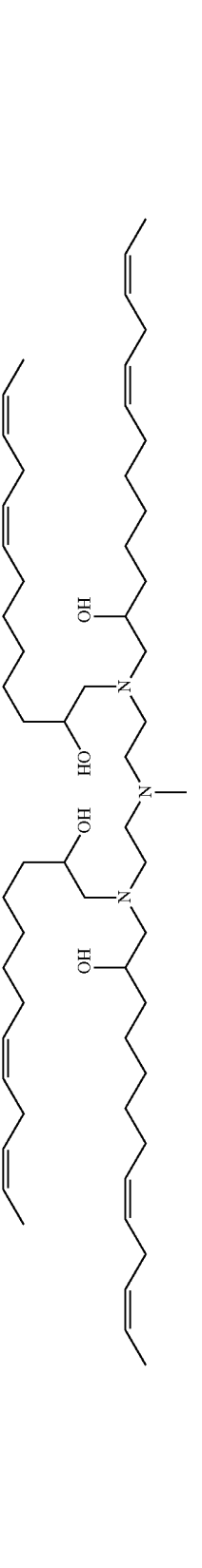 |
| III-26 | 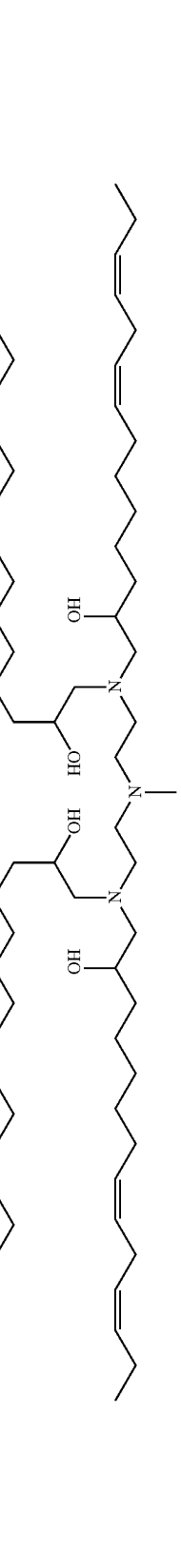 |

TABLE 1-continued

| No. | Structural formula |
|---|---|
| III-27 | |
| III-28 | |
| III-29 | |
| III-30 | |

TABLE 1-continued

| No. | Structural formula |
|---|---|
| III-31 | |
| III-32 | |
| III-33 | |
| III-34 | |

TABLE 1-continued
| No. | Structural formula |
|---|---|
| III-35 | |
| III-36 | |
| III-37 | |
| III-38 | |
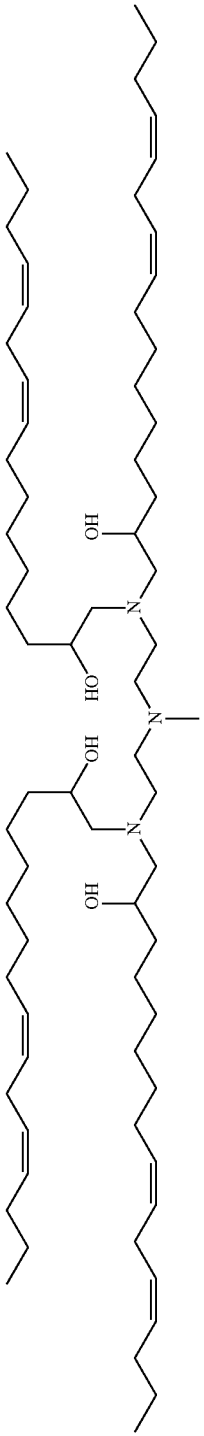
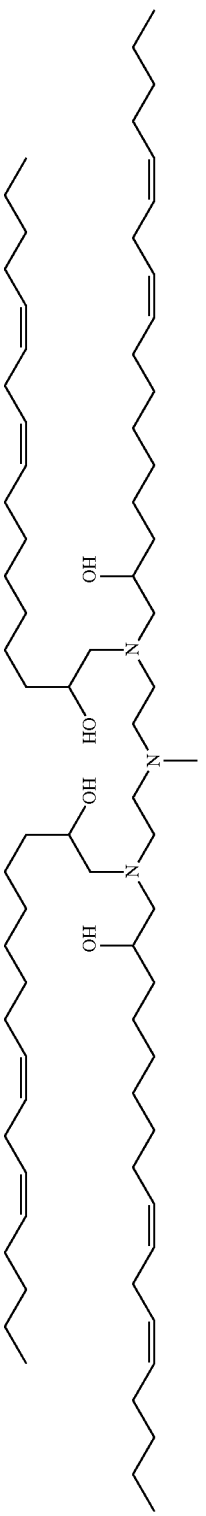
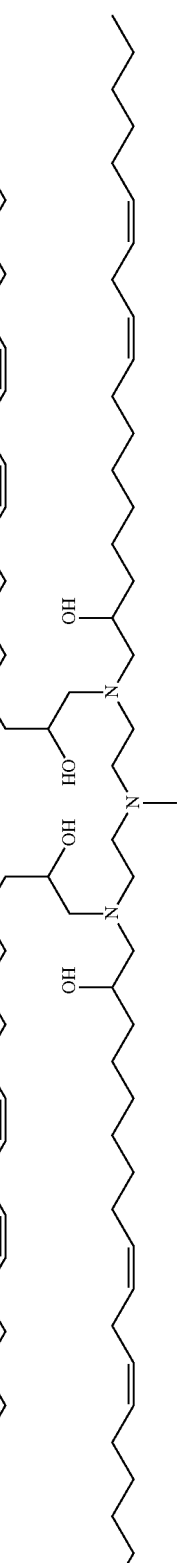
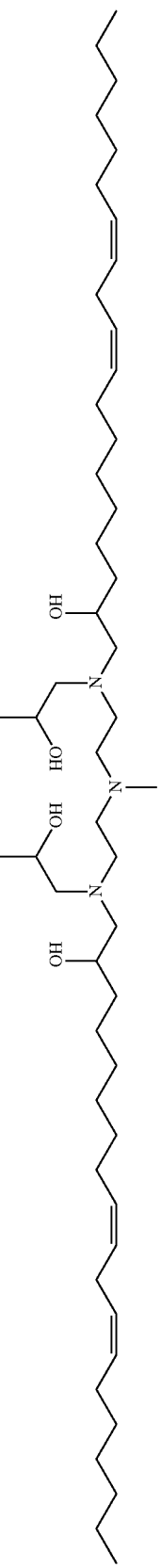

TABLE 1-continued

| No. | Structural formula |
|---|---|
| III-39 | |
| III-40 | |
| III-41 | |
| III-42 | |
| III-43 | |

TABLE 1-continued

| No. | Structural formula |
|---|---|
| III-44 | |
| III-45 | |
| III-46 | |
| III-47 | |
| III-48 | |

TABLE 1-continued

| No. | Structural formula |
|---|---|
| III-49 | |
| III-50 | |
| III-51 | |
| III-52 | |

TABLE 1-continued

| No. | Structural formula |
|---|---|
| III-53 | |
| III-54 | |
| III-55 | |
| III-56 | |

The ionizable lipid compound of the present invention can be synthesized using methods known in the art, for example, by reacting one or more equivalents of an amine with one or more equivalents of an epoxy-terminated compound under suitable conditions. The synthesis of ionizable lipid compounds is carried out with or without solvents and can be carried out at a higher temperature in the range of 25° C.-100° C. The prepared ionizable lipid compound can optionally be purified. For example, a mixture of the ionizable lipid compounds can be purified to give a specific ionizable lipid compound. Alternatively, the mixture can be purified to give a specific stereoisomer or regioisomer. The epoxide can be purchased commercially or prepared synthetically.

In certain embodiments, all amino groups of the amines are completely reacted with the epoxy-terminated compound to form a tertiary amine. In other embodiments, not all amino groups of the amines are completely reacted with the epoxy-terminated compound, thereby producing primary or secondary amines in the ionizable lipid compound. These primary or secondary amines are left as such or can be reacted with another electrophile such as a different epoxy-terminated compound. It will be appreciated by those skilled in the art that reacting the excessive amine with the epoxy-terminated compound will produce a variety of different ionizable lipid compounds with various numbers of tails. For example, diamines or polyamines can comprise one, two, three, or four epoxy-derived compound tails on various amino moieties of the molecule, thereby producing primary, secondary, and tertiary amines. In certain embodiments, two epoxy-terminated compounds of the same type are used. In other embodiments, two or more different epoxy-terminated compounds are used.

In some embodiments of the present invention, the ionizable lipid compound of the present invention can be prepared using the following general preparation method.

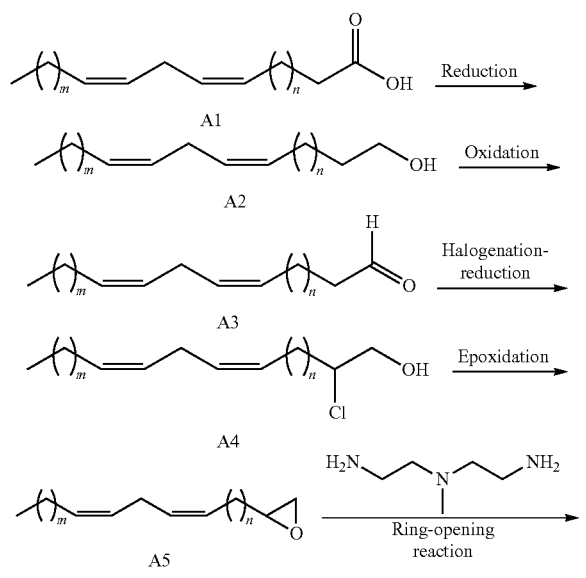

Step 1: Reduction

In the presence of a reductant, the carboxyl group of compound A1 is reduced to a hydroxyl group to give compound A2. Examples of the reductant include, but are not limited to, lithium aluminum hydride, diisobutyl aluminum hydride, etc. Examples of solvents used in the reaction include, but are not limited to, ethers (e.g., ethyl ether, tetrahydrofuran, dioxane, etc.), halogenated hydrocarbons (e.g., chloroform, dichloromethane, dichloroethane, etc.), hydrocarbons (e.g., n-pentane, n-hexane, benzene, toluene, etc.), and mixed solvents formed by two or more of these solvents.

Step 2: Oxidation

In the presence of an oxidant, the hydroxyl group of compound A2 is oxidized to an aldehyde group to give compound A3. Examples of the oxidant include, but are not limited to, 2-iodoxybenzoic acid (IBX), pyridinium chlorochromate (PCC), pyridinium dichromate (PDC), Dess-Martin periodinane, manganese dioxide, etc. Examples of solvents used in the reaction include, but are not limited to, halogenated hydrocarbons (e.g., chloroform, dichloromethane, dichloroethane, etc.), hydrocarbons (e.g., n-pentane, n-hexane, benzene, toluene, etc.), nitriles (e.g., acetonitrile), and mixed solvents formed by two or more of these solvents.

Step 3: Halogenation-Reduction

Firstly, an aldehyde α-hydrogen of compound A3 is subjected to a halogenation reaction with a halogenating reagent under an acidic condition to give an α-halogenated aldehyde intermediate, and then in the presence of a reductant, the aldehyde group of the α-halogenated aldehyde is reduced to a hydroxyl group to give compound A4. Examples of providing the acidic condition include, but are not limited to, providing DL-proline. Examples of the halogenating reagent include, but are not limited to, N-chlorosuccinimide (NCS) and N-bromosuccinimide (NBS). Examples of the reductant include, but are not limited to, sodium borohydride, sodium cyanoborohydride, and sodium triacetoxyborohydride.

Step 4: Epoxidation

In the presence of a base, compound A4 is subjected to an intramolecular nucleophilic substitution reaction to give epoxide A5. Examples of the base include, but are not limited to, hydroxides or hydrides of alkali metals, such as sodium hydroxide, potassium hydroxide, and sodium hydride. Examples of solvents used in the reaction include, but are not limited to, a mixture of dioxane and water.

Step 5: Ring-Opening Reaction

Compound A5 is subjected to a ring-opening reaction with an amine (e.g., N,N-bis(2-aminoethyl)methylamine) to give a final compound. Examples of solvents used in the reaction include, but are not limited to, ethanol, methanol, isopropanol, tetrahydrofuran, trichloromethane, hexane, toluene, ethyl ether, etc.

The raw material A1 in the preparation method can be purchased commercially or synthesized by a conventional method.

The ionizable lipid molecule structure of the present invention contains two adjacent cis-double bonds, so that the ionizable lipid compound has higher encapsulation efficiency and better cell transfection efficiency when being subsequently used in the delivery system for encapsulating active substances (e.g., nucleic acids, such as mRNA); in addition, when the ionizable lipid compound is used for preparing lipid nanoparticles, the particle size of the obtained lipid nanoparticles is more uniform. The ionizable lipid compound of the present invention is particularly suitable for preparing solid nanoparticles.

The ionizable lipid compound of the present invention, when used in a drug delivery system, can encapsulate medicaments, including polynucleotides, small molecules, proteins, peptides, metals, etc. The ionizable lipid compound has several properties that are suitable for preparing the drug delivery system: 1) the ability of lipids to complex and "protect" unstable medicaments; 2) the ability to buffer the pH in vivo; 3) the ability to act as a "proton sponge" and cause dissolution in vivo; and 4) the ability to neutralize charges on negatively charged active substances.

The drug delivery system can be in the form of particles. In certain embodiments, the particle diameter is in the range of 1 μm to 1000 μm. In certain embodiments, the particle diameter is in the range of 1 nm to 1000 nm. For example, the particle diameter is in the range of 1 μm to 100 μm, or in the range of 1 μm to 10 μm, or in the range of 10 μm to 100 μm, or in the range of 20 nm to 800 nm, or in the range of 50 nm to 500 nm, or in the range of 80 nm to 200 nm, or in the range of 1 nm to 100 nm, or in the range of 1 nm to 10 nm. When the particle size is in the range of 1 nm to 1000 nm, it is generally referred to as nanoparticles in the art. The particles can be prepared using any method known in the art. These methods include, but are not limited to, spray drying, single and double emulsion solvent evaporation, solvent extraction, phase separation, nanoprecipitation, microfluidics, simple and complex coacervation, and other methods well known to those of ordinary skill in the art.

The drug delivery system can also be microbubbles, liposomes, or lipid nanoparticles, which are well suitable for delivering medicaments.

The active substance delivered by the delivery system formed by the ionizable lipid compound of the present invention can be a therapeutic, diagnostic, or prophylactic agent. The active substance can be in the nature of a small molecule compound, a nucleic acid, a protein, a peptide, a metal, an isotopically-labeled compound, a vaccine, etc.

The delivery system formed by the ionizable lipid compound of the present invention can also be modified with a targeting molecule, such that it can be a targeting agent capable of targeting a specific cell, tissue, or organ. The targeting molecule can be contained in the entire delivery system or can be located only on its surface. The targeting molecule can be a protein, a peptide, a glycoprotein, a lipid, a small molecule, a nucleic acid, etc. Examples of the targeting molecule include, but are not limited to, an antibody, an antibody fragment, low-density lipoprotein (LDL), transferrin, asialycoprotein, a receptor ligand, sialic acid, an aptamer, etc.

The delivery system formed by the ionizable lipid compound of the present invention can be combined with one or more pharmaceutical excipients to form a pharmaceutical composition suitable for administering to an animal, including a human. The term "pharmaceutical excipient" refers to any type of non-toxic, inert solid, semi-solid or liquid filler, diluent, etc., including, but not limited to, sugars such as lactose, trehalose, glucose, and sucrose; starches such as corn starch and potato starch; cellulose and derivatives thereof such as sodium carboxymethyl cellulose, ethyl cellulose, and cellulose acetate; gelatin; talc; oils such as peanut oil, cottonseed oil, safflower oil, olive oil, corn oil, and soybean oil; glycols such as propylene glycol; esters such as ethyl oleate and ethyl laurate; surfactants such as Tween 80; buffers such as phosphate buffer, acetate buffer, and citrate buffer; coloring agents, sweetening agents, flavoring agents, fragrances, preservatives, antioxidants, etc.

The pharmaceutical composition of the present invention can be administered to a human and/or an animal orally, rectally, intravenously, intramuscularly, intravaginally, intranasally, intraperitoneally, buccally, or in the form of oral or nasal spray.

As used herein, the term "alkyl" refers to a saturated hydrocarbyl group obtained by the removal of a single hydrogen atom from a hydrocarbon moiety containing 1 to 30 carbon atoms. Examples of the alkyl include, but are not limited to, methyl, ethyl, propyl, isopropyl, n-butyl, sec-butyl, tert-butyl, n-pentyl, isopentyl, neopentyl, n-hexyl, n-heptyl, n-octyl, n-decyl, n-undecyl, and n-dodecyl.

The term "alkenyl" refers to a monovalent group obtained by the removal of a single hydrogen atom from a hydrocarbon moiety having at least one carbon-carbon double bond. The alkenyl includes, for example, ethenyl, propenyl, butenyl, 1-methyl-2-buten-1-yl, etc.

The term "alkynyl" refers to a monovalent group obtained by the removal of a single hydrogen atom from a hydrocarbon moiety having at least one carbon-carbon triple bond. Representative alkynyl includes ethynyl, 2-propynyl (propargyl), 1-propynyl, etc.

The term "alkoxy" refers to an alkyl, as defined above, linked to a parent molecule through an oxygen atom. Examples of the alkoxy include, but are not limited to, methoxy, ethoxy, propoxy, isopropoxy, n-butoxy, tert-butoxy, neopentoxy, and n-hexoxy.

The terms "halo-" and "halogen" refer to an atom selected from fluorine, chlorine, bromine, and iodine.

The term "saturated or unsaturated 4- to 6-membered ring" refers to a ring having 4 to 6 ring atoms that may be C, N, S, or O. Examples of the saturated or unsaturated 4- to 6-membered ring include, but are not limited to, 4- to 6-membered saturated cycloalkyl such as cyclopropyl, cyclobutyl, cyclopentyl, cyclohexyl; 4- to 6-membered aryl such as phenyl; 4- to 6-membered heterocyclyl such as pyrrolidinyl, piperidyl, piperazinyl, morpholinyl, etc.; 4- to 6-membered heteroaryl such as triazolyl, oxazolyl, isoxazolyl, thiazolyl, etc. In some embodiments of the present invention, the saturated or unsaturated 4- to 6-membered ring is preferably piperazinyl or cyclohexyl.

The terms "substituted" (whether the term "optionally" is present above or not) and "substituent" refer to the ability to change one functional group to another functional group, provided that the valence number of all atoms is maintained. When more than one positions in any specific structure can be substituted with more than one substituents selected from a specified group, the substituents can be identical or different at each position.

DETAILED DESCRIPTION

Figure 1:
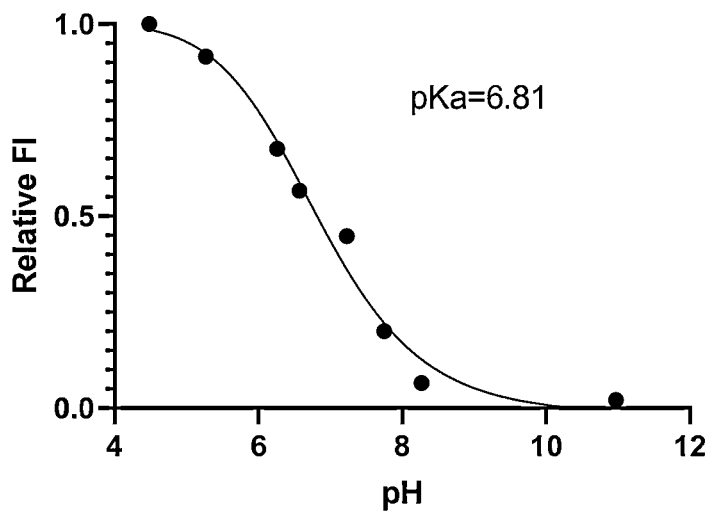
FIG. 1 shows the pKa curve of ionizable lipid II-37.

The technical solutions of the present invention will be further illustrated in detail with reference to the following specific examples. It should be understood that the following examples are merely exemplary illustrations and explanations of the present invention, and should not be construed as limiting the protection scope of the present invention. All techniques implemented based on the content of the present invention described above are included within the protection scope of the present invention.

Unless otherwise stated, the raw materials and reagents used in the following examples are all commercially available products or can be prepared using known methods.

Example 1: Synthesis of Ionizable Lipid II-37

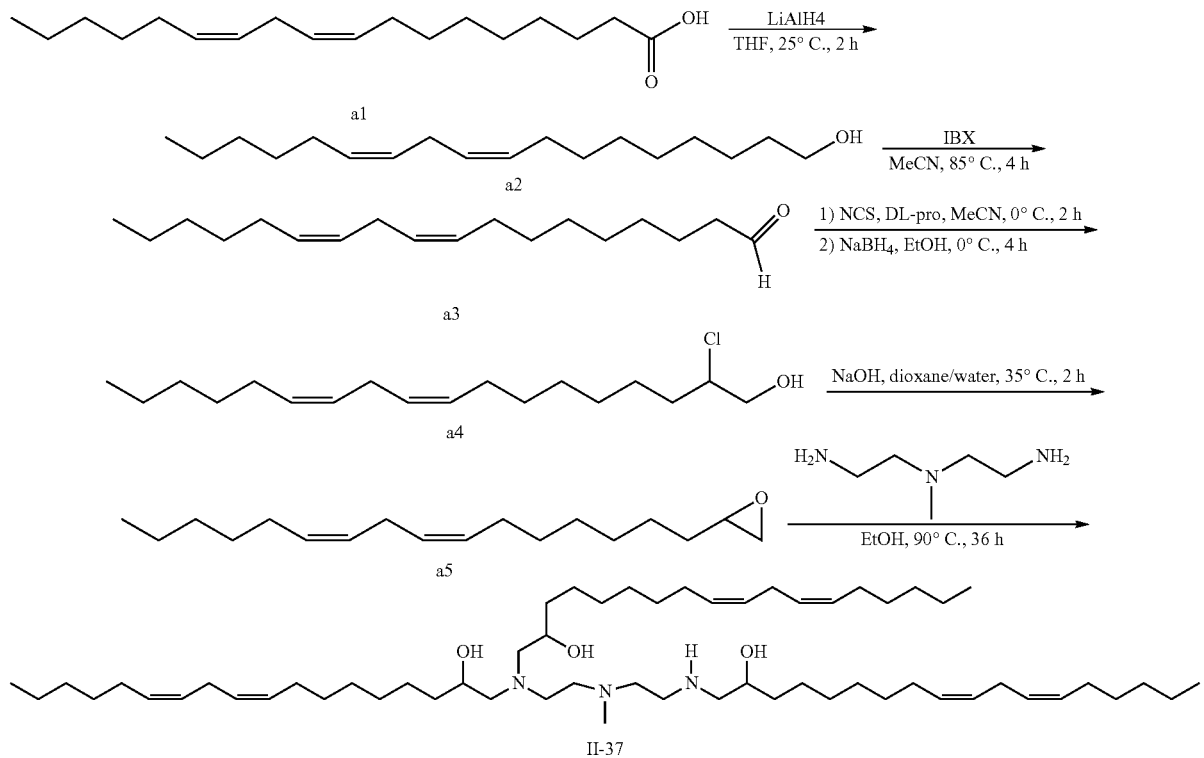

Synthesis of linoleyl alcohol (a2): LiAlH$_4$ (7.20 g) and linoleic acid (50 g, a1) were added to tetrahydrofuran (950 mL) at 0° C., and then the mixture was stirred at 25° C. for 2 h. After the reaction was completed, as detected by thin layer chromatography (TLC), water (7.2 mL), an aqueous NaOH solution (7.2 mL, mass fraction: 15%), and water (21.6 mL) were sequentially added to the reaction solution to quench the reaction, and an appropriate amount of Na$_2$SO$_4$ was added. After being stirred for 15 min, the mixture was filtered through a Buchner funnel, the filter cake was washed with ethyl acetate, and the filtrate was collected and concentrated by evaporation to give the target product linoleyl alcohol (a2, 47.4 g).

$^1$H NMR (400 MHZ, CDCl$_3$): δ 5.27-5.44 (m, 4H), 3.63 (t, J=6.63 Hz, 2H), 2.77 (t, J=6.44 Hz, 2H), 1.97-2.12 (m, 4H), 1.57-1.63 (m, 1H), 1.20-1.46 (m, 18H), 0.83-0.95 (m, 3H)

Synthesis of (9Z,12Z)-octadeca-9,12-dienal (a3): Linoleyl alcohol (25.0 g, a2) and 2-iodoxybenzoic acid (39.4 g) were added to acetonitrile (170 mL) at room temperature, and then the mixture was stirred at 85° C. for 4 h. The reaction solution was filtered through a Buchner funnel, the filter cake was washed with dichloromethane, and the filtrate was collected and concentrated by evaporation to give the target product (9Z,12Z)-octadeca-9,12-dienal (a3, 24.0 g).

$^1$H NMR (400 MHZ, CDCl$_3$): δ 9.76 (t, J=1.76 Hz, 1H), 5.25-5.43 (m, 4H), 2.76 (t, J=6.17 Hz, 2H), 2.41 (td, J=7.33, 1.87 Hz, 2H), 2.04 (q, J=6.84 Hz, 4H), 1.56-1.68 (m, 2H), 1.22-1.36 (m, 14H), 0.88 (t, J=6.73 Hz, 3H)

Synthesis of (9Z,12Z)-2-chloro-octadeca-9,12-dien-1-ol (a4): (9Z,12Z)-Octadeca-9,12-dienal (43.0 g, a3), DL-proline (5.62 g), and N-chlorosuccinimide were added to acetonitrile (246 mL) at 0° C., and then the mixture was stirred at 0° C. for 2 h. After the reaction was completed, the reaction solution was diluted with absolute ethanol (246 mL), sodium borohydride (8.8 g) was added, and then the mixture was stirred at 0° C. for 4 h. The reaction mixture was quenched with water (120 mL) and extracted with methyl tert-butyl ether. The organic phases were combined, washed with saturated brine, dried over sodium sulfate, filtered, and concentrated by evaporation to give the target product (9Z,12Z)-2-chloro-octadeca-9,12-dien-1-ol (a4, 46 g), which was used directly in the next step.

$^1$H NMR (400 MHZ, CDCl$_3$): δ 5.25-5.51 (m, 4H), 3.97-4.07 (m, 1H), 3.79 (dd, J=12.01, 3.63 Hz, 1H), 3.59-3.70 (m, 1H), 2.67-2.90 (m, 2H), 1.96-2.15 (m, 5H), 1.64-1.82 (m, 1H), 1.20-1.49 (m, 15H), 0.89 (br t, J=6.75 Hz, 3H)

Synthesis of 2-[(7Z,10Z)-hexadeca-7,10-dien-1-yl]oxirane (a5): (9Z,12Z)-2-Chloro-octadeca-9,12-dien-1-ol (45 g, a4) and an aqueous sodium hydroxide solution (120 g sodium hydroxide was dissolved in 585 mL of water) were added to 1,4-dioxane (450 mL) at room temperature. After the dropwise addition, the mixture was stirred at 35° C. for 2 h. After the reaction was completed, as detected by TLC, the reaction solution was separated by a separating funnel, washed with saturated brine, dried over sodium sulfate, filtered, and concentrated by evaporation, and then the residue was purified by flash column chromatography using petroleum ether/ethyl acetate as an eluent to give the target product 2-[(7Z,10Z)-hexadeca-7,10-dien-1-yl]oxirane (a5, 29.11 g).

$^1$H NMR (400 MHZ, CDCl$_3$): δ 5.27-5.46 (m, 4H), 2.87-2.98 (m, 1H), 2.70-2.85 (m, 3H), 2.46 (dd, J=5.00, 2.75 Hz, 1H), 1.94-2.21 (m, 4H), 1.24-1.58 (m, 17H), 0.78-1.00 (m, 3H)

Synthesis of II-37: 2-[(7Z,10Z)-hexadeca-7,10-dien-1-yl]oxirane (5 g) and N,N-bis(2-aminoethyl)methylamine (739 mg) were added to ethanol (10 mL) at room temperature, and the mixture was stirred at 90° C. for 36 h. The reaction solution was concentrated by evaporation, and the residue was purified by flash column chromatography using dichloromethane/methanol as an eluent to give crude product II-37 (4 g). The target product was again purified by flash column chromatography with dichloromethane/methanol to give II-37 (2.2 g).

$^1$H NMR (400 MHz, CDCl$_3$): δ 5.27-5.44 (m, 12H), 3.48-3.79 (m, 3H), 2.63-3.00 (m, 12H), 2.16-2.61 (m, 12H), 2.05 (q, J=6.80 Hz, 12H), 1.18-1.57 (m, 51H), 0.89 (t, J=6.88 Hz, 9H)

ESI-MS: m/z 910.8 [M+H]$^+$, 911.8 [M+2H]$^+$, 912.8 [M+3H]$^+$

Example 2: Dissociation Constant (pKa) of Ionizable Lipid II-37

Ionizable lipids have two main roles: binding to nucleic acids and allowing the release of the nucleic acid molecules in cells. The pKa of lipids is an important factor, because the lipids need to be positively charged at a low pH value to bind to nucleic acids, but not charged at a neutral pH value, such that the formed LNPs do not cause toxicity. The ionizable lipid II-37 was determined to have a pKa of 6.81 by a TNS dye-binding assay. The results are shown in FIG. 1.

Example 3: Preparation of Lipid Nanoparticles by II-37 Encapsulating mRNA

Ionizable lipid II-37, DSPC, CHOL, and DMG-PEG2000 were dissolved in ethanol according to a molar ratio of 35%:15%:48.5%:1.5% as an organic phase, and Lucferase mRNA (LucRNA) was dissolved in an aqueous solution with the pH of 4 as an aqueous phase. A nanoparticle suspension was prepared by microfluidic technology on a nanomedicine manufacturing instrument (PrecisionNanoSystems Inc. (PNI), Canada, model: Ignite) according to a volume ratio of aqueous phase to organic phase of 3:1. After the preparation was completed, an ultrafiltration concentration was performed on the suspension to give the final LucRNA-LNP lipid nanoparticle, which was stored at 2° C. to 8° C. for later use.

The particle size and Zeta potential of LucRNA-LNP were characterized by a Zetasizer Pro nanoparticle size potentiometer (Malvern Panalytical). The encapsulation efficiency of LucRNA-LNP was detected by the Ribogreen method using an F-280 fluorescence spectrophotometer (Tianjin Gangdong Sci.&Tech. Co. Ltd). The CHO cells transfection efficiency of the prepared LucRNA-LNP was detected by a fluorescein reporter gene assay using a multi-mode microplate reader (BioTek, model: SLXFATS). The method for in vitro transcription of LucRNA was as follows: CHO-KI cells were plated at a cell density of 2.5×10$^5$ cells/mL, and transfection was performed when the cell confluence was 30%-50%. 2 μg of LucRNA was added to each well for transfection, and the positive control was transfected using a transfection reagent Lipofectamine MessagerMAX (ThermoFisher Scientific). The transfection operation was performed according to a product instruction of the transfection reagent. After 48 h of transfection, the protein expression level was detected by the multi-mode microplate reader. The negative control was a cell culture medium without LucRNA-LNP. The detection results in Example 3 are shown in Table 2.

TABLE 2

| | Particle size (nm) | PDI | Zeta potential (mV) | Encapsulation efficiency (%) | RLU (2 μg/mL) |
|---|---|---|---|---|---|
| LucRNA-LNP | 108.66 | 0.13 | 17.87 | 96.4% | 1088112 |

It can be seen from the results in Example 3 that the particle size of the lipid nanoparticle LucRNA-LNP prepared by the combination of the novel lipid compound is about 108 nm, the particle size distribution of LucRNA-LNP is relatively narrow (PDI is relatively small), and the encapsulation efficiency is up to 96%. The in vitro cell transfection efficiency is up to 1 million. The results show that the mRNA-encapsulated LNP prepared from the ionizable lipid II-37 not only has very good physicochemical parameters, but also has extremely high cell transfection efficiency.

Figure 2:
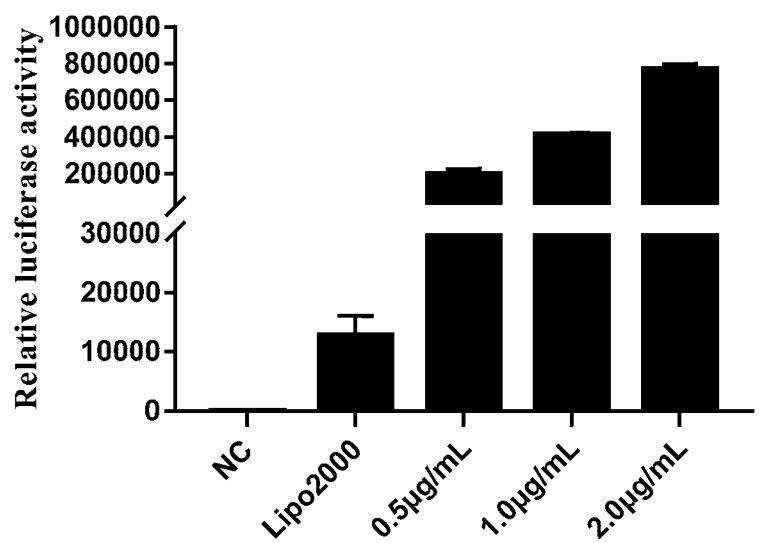
FIG. 2 shows the cell transfection efficiency of mRNA-encapsulated LNP formed by ionizable lipid II-37.

Further, the HEK293T cells transfection efficiency of LucRNA-LNP prepared by the same LNP was detected by the fluorescein reporter gene assay using the multi-mode microplate reader (BioTek, model: SLXFATS), and the amount of transfected LucRNA was 0.5 μg, 1.0 μg, and 2.0 μg, respectively. The method for in vitro transcription of LucRNA was as follows: HEK293T cells were plated at a cell density of 2.5×10$^5$ cells/mL, and transfection was performed when the cell confluence was 30%-50%. The positive control was transfected with 0.5 μg of LucRNA using a transfection reagent Lipofectamine 2000 (ThermoFisher Scientific). The transfection operation was performed according to a product instruction of the transfection reagent. After 48 h of transfection, the protein expression level was detected by the multi-mode microplate reader. The negative control was a cell culture medium without LucRNA-LNP. The in vitro cell transfection efficiency is shown in FIG. 2, indicating that mRNA-encapsulated LNP prepared from the ionizable lipid II-37 has extremely high cell transfection efficiency, which is about 10 times higher than that of the commercial Lipofectamine 2000 when the same amount of mRNA was transfected.

Example 4: Preparation of Lipid Nanoparticles by II-37 Encapsulating DNA

Ionizable lipid II-37, DSPC, CHOL, and DMG-PEG2000 were dissolved in ethanol according to a molar ratio of 45%:10%:43.5%:1.5% as an organic phase, and Lucferase DNA (pDNA) was dissolved in an aqueous solution with the pH of 4 as an aqueous phase. A nanoparticle suspension was prepared by microfluidic technology on a nanomedicine manufacturing instrument (PNI, Canada, model: Ignite) according to a volume ratio of aqueous phase to organic phase of 3:1. After the preparation was completed, an ultrafiltration concentration was performed on the suspension to give the final pDNA-LNP lipid nanoparticle, which was stored at 2° C. to 8° C. for later use.

The particle size and Zeta potential of pDNA-LNP were characterized by a Zetasizer Pro nanoparticle size potentiometer (Malvern Panalytical). The detection results in Example 4 are shown in Table 3, showing that the particle size of the lipid nanoparticle pDNA-LNP prepared by the combination of the novel lipid compound is about 173 nm, and the particle size distribution of pDNA-LNP is relatively narrow (PDI is relatively small).

TABLE 3

| | Particle size (nm) | PDI | Zeta potential (mV) |
|---|---|---|---|
| pDNA-LNP | 173.2 | 0.213 | 24.1 |

Figure 3:
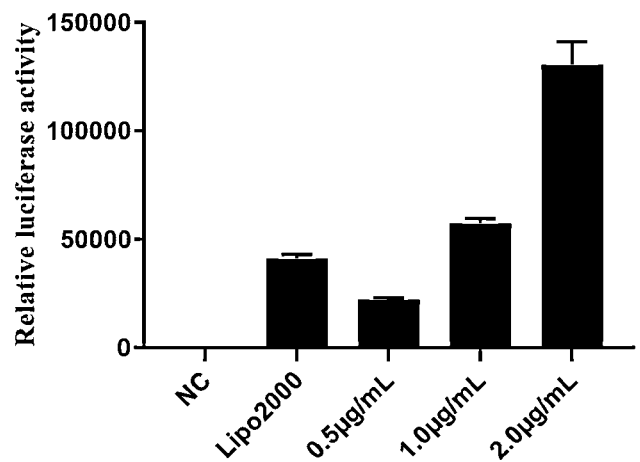
FIG. 3 shows the cell transfection efficiency of pDNA-encapsulated LNP formed by ionizable lipid II-37.

The 293T cells transfection efficiency of the prepared pDNA-LNP was detected by a fluorescein reporter gene assay using a multi-mode microplate reader (BioTek, model: SLXFATS), and the amount of transfected pDNA was 0.5 µg, 1.0 µg, and 2.0 µg, respectively. The method for in vitro transcription was as follows: 293T cells were plated at a cell density of $2.0 \times 10^5$ cells/mL, and transfection was performed when the cell confluence was 30%-50%. The positive control was transfected with 2 µg of pDNA using a transfection reagent Lipofectamine 2000 (ThermoFisher Scientific). The transfection operation was performed according to a product instruction of the transfection reagent. After 48 h of transfection, the protein expression level was detected by the multi-mode microplate reader. The negative control was a cell culture medium without pDNA-LNP. The in vitro cell transfection efficiency is shown in FIG. 3, indicating that DNA-encapsulated LNP prepared from the ionizable lipid II-37 has extremely high cell transfection efficiency: the protein expression level of 1.0 µg of pDNA transfected with the LNP prepared from II-37 is higher than that of 2 µg of pDNA transfected with Lipofectamine 2000; the in vitro cell transfection efficiency of II-37 is about 3 times higher than that of the commercial Lipofectamine 2000 when the same 2 µg of pDNA was transfected.

Example 5: Preparation of Lipid Nanoparticles by II-37 Encapsulating siRNA

Ionizable lipid II-37, DSPC, CHOL, and DMG-PEG2000 were dissolved in ethanol according to a molar ratio of 45%:15%:38.5%:1.5% as an organic phase, and Lucferase siRNA (siRNA) was dissolved in an aqueous solution with the pH of 4 as an aqueous phase. A nanoparticle suspension was prepared by microfluidic technology on a nanomedicine manufacturing instrument (PNI, Canada, model: Ignite) according to a volume ratio of aqueous phase to organic phase of 3:1. After the preparation was completed, an ultrafiltration concentration was performed on the suspension to give the final siRNA-LNP lipid nanoparticle, which was stored at 2° C. to 8° C. for later use.

The particle size and Zeta potential of siRNA-LNP were characterized by a Zetasizer Pro nanoparticle size potentiometer (Malvern Panalytical). The detection results in Example 5 are shown in Table 4. The particle size of the lipid nanoparticle siRNA-LNP prepared by the combination of the novel lipid compound is about 294 nm.

TABLE 4

| | Particle size (nm) | PDI | Zeta potential (mV) |
|---|---|---|---|
| siRNA-LNP | 294.0 | 0.318 | 20.3 |

Figure 4:
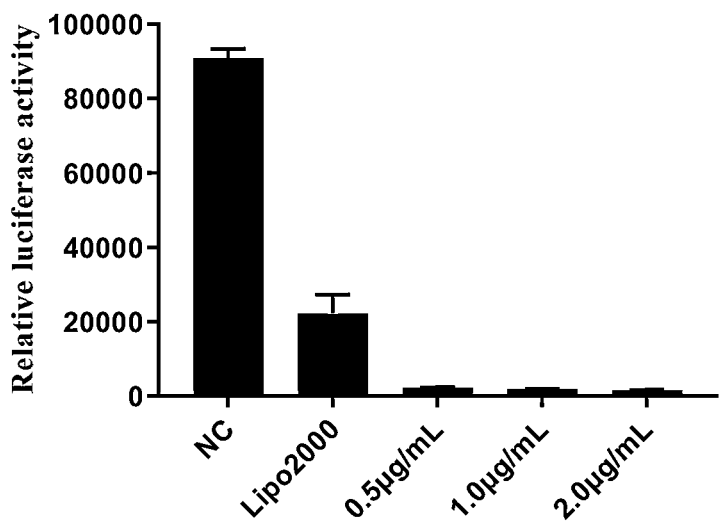
FIG. 4 shows the cell transfection efficiency of siRNA-encapsulated LNP formed by ionizable lipid II-37.

The 293T cells transfection efficiency of the prepared siRNA-LNP was detected by a fluorescein reporter gene assay using a multi-mode microplate reader (BioTek, model: SLXFATS), and the amount of transfected siRNA was 0.5 µg, 1.0 µg, and 2.0 µg, respectively. The method for in vitro transcription was as follows: Lucferase reporter stably transfected 293T cells were plated at a cell density of $2.0 \times 10^5$ cells/mL, and transfection was performed when the cell confluence was 30%-50%. The positive control was transfected with 1.0 µg of siRNA using a transfection reagent Lipofectamine 2000 (ThermoFisher Scientific). The transfection operation was performed according to a product instruction of the transfection reagent. After 24 h of transfection, the protein expression level was detected by the multi-mode microplate reader. The negative control was a cell culture medium without siRNA-LNP. The in vitro cell transfection efficiency is shown in FIG. 4, indicating that siRNA-encapsulated LNP prepared from the ionizable lipid II-37 has extremely high protein knockdown efficiency.

Example 6: Effect Comparison of II-37 and Commercial Ionizable Cationic Lipid Molecule MC3

The molecular formula of MC3 was (6Z,9Z,28Z,31Z)-heptatriaconta-6,9,28,31-tetraen-19-yl 4-(N,N-dimethylamino)butanoate.

Lipid nanoparticles were prepared according to the method described in Example 3 using II-37 and MC3, respectively, at the following specific molar ratios: II-37: DSPC:CHOL:DMG-PEG2000=45:15:38.5:1.5; MC3: DSPC:CHOL:DMG-PEG2000=45:15:38.5:1.5; the N/P ratio was 5:1.

The physicochemical and quality control data of the prepared lipid nanoparticles are shown in the following table:

| Sample information | Particle size (nm) | PDI | Zeta potential | Encapsulation efficiency |
|---|---|---|---|---|
| mRNA-LNP (II-37) | 154.58 | 0.1068 | 22.07 | 90.5 |
| mRNA-LNP (MC3) | 234.08 | 0.1259 | 2.44 | 40.7 |

It can be seen from the above table that the encapsulation efficiency of the lipid nanoparticle prepared from II-37 is up to 90.5%, which is much higher than that of the lipid nanoparticle prepared from MC3, and the lipid nanoparticle has smaller and more uniform particle size and higher potential.

Figure 5:
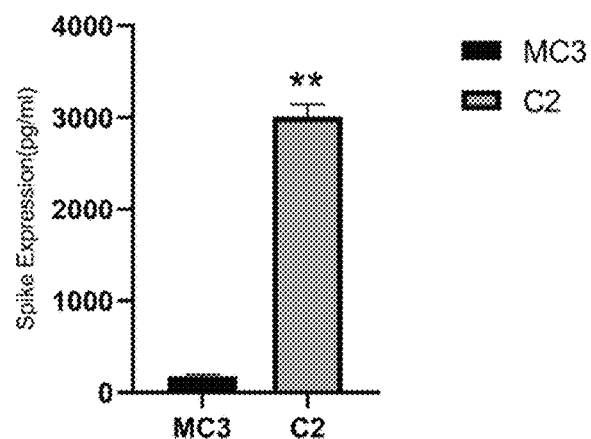
FIG. 5 shows the comparison of cell transfection efficiencies of mRNA-encapsulated LNPs formed by ionizable lipid II-37 and commercial molecule MC3, respectively.

When the prepared lipid nanoparticles were transfected into CHO-K1 cells according to the same transfection method as in Example 3, the expression of protein was known. The results are shown in FIG. 5. Under the same amount of transfected mRNA, after the lipid nanoparticle prepared from II-37 (shown as C2 in the figure) carrying mRNA was transfected into the cells, the expression of protein in the cells was much higher than that of MC3, indicating that the lipid nanoparticle prepared from II-37 has very high cell transfection efficiency.

Figure 6:
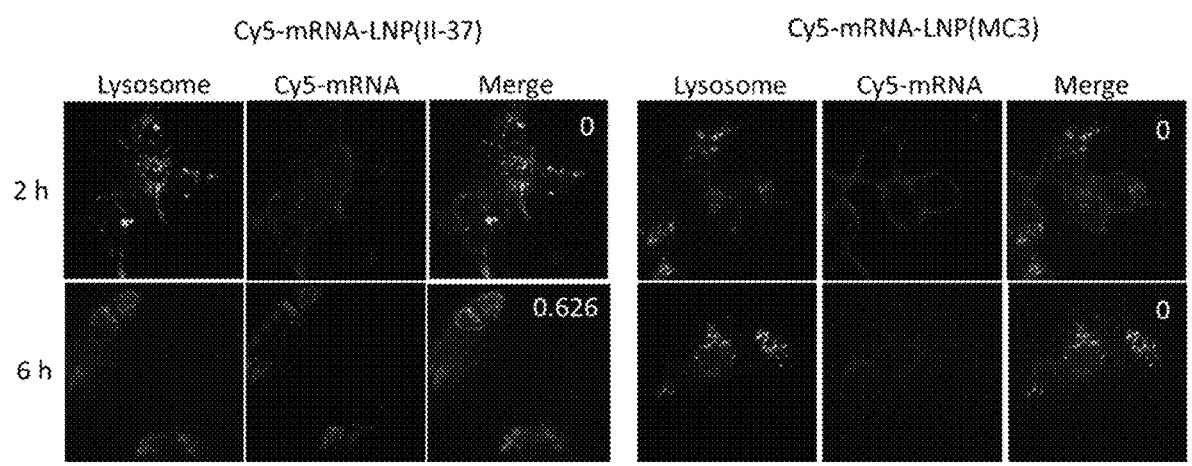
FIG. 6 shows that the loaded mRNA is labeled with Cy5, the mRNA-encapsulated LNPs are formed by ionizable lipid II-37 and commercial molecule MC3, respectively, and the efficiencies of the LNPs in delivering mRNA into cells are observed by fluorescence staining.

In addition, Cy5-mRNA-LNP (II-37) and Cy5-mRNA-LNP (MC3) were obtained by labeling the loaded mRNA with Cy5. After 2 h and 6 h of incubation with 293T cells, cellular lysosomes were stained with LysoSensor™ Green, and the effect of Cy5-mRNA entering into the cells was observed. It can be seen from FIG. 6 that after Cy5-mRNA-LNP (II-37) was incubated with the cells for 6 h, most of Cy5-mRNA reached lysosomes with a colocalization coefficient of 0.626; after Cy5-mRNA-LNP (MC3) was incubated with the cells for 6 h, Cy5-mRNA was less likely to enter into the cells. It can be seen from the comparison that the nucleic acid delivery efficiency of the II-37 molecule is better than that of the MC3 molecule.

It can be seen from the results in Example 6 that the lipid nanoparticles prepared by the combination of the novel lipid compound are superior to the MC3 molecule in both nucleic acid delivery efficiency and in vitro cell transfection efficiency.

Example 7: Comparison of II-37 and its Structural Analog Molecule C14-113

The structural formula of C14-113 was as follows:

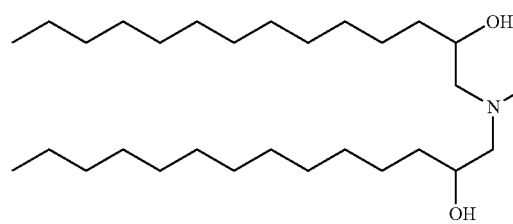

Lipid nanoparticles were prepared according to the method described in Example 3 using II-37 and C14-113, respectively, at the following specific molar ratios: II-37: DSPC:CHOL:DMG-PEG2000=45:15:38.5:1.5; C14-113: DSPC:CHOL:DMG-PEG2000=45:15:38.5:1.5; the N/P ratio was 10:1.

The physicochemical and quality control data of the prepared lipid nanoparticles are shown in the following table:

| Sample information | Particle size (nm) | PDI | Zeta potential |
|---|---|---|---|
| mRNA-LNP (II-37-LNP) | 136.68 | 0.14 | 20.07 |
| mRNA-LNP (C14-113-LNP) | 152.65 | 0.12 | 24.1 |

Figure 7:
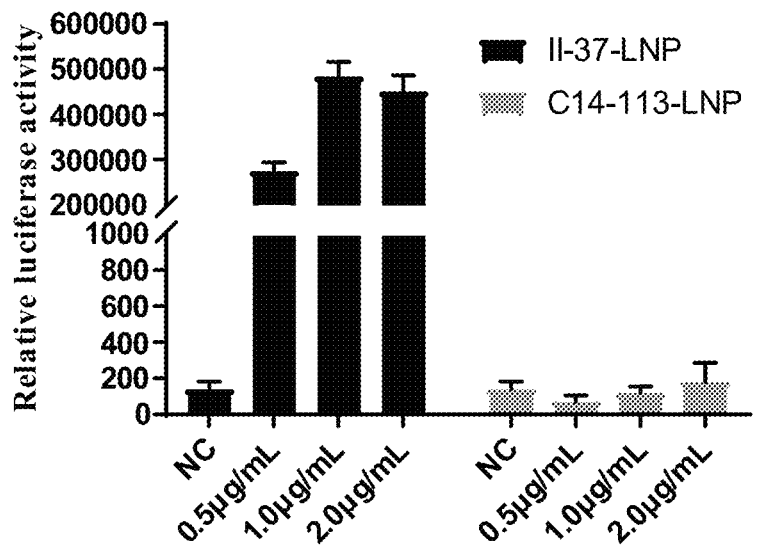
FIG. 7 shows the comparison of cell transfection efficiencies of mRNA-encapsulated LNPs formed by ionizable lipid II-37 and C14-113, respectively.

When the prepared lipid nanoparticles were transfected into 293T cells according to the same transfection method as in Example 3, the expression of protein was known. The results are shown in FIG. 7. Under the same amount of transfected mRNA, after the lipid nanoparticle prepared from II-37 (shown as II-37-LNP in the figure) carrying mRNA was transfected into the cells, the expression of protein in the cells was much higher than that of C14-113, indicating that the lipid nanoparticle prepared from II-37 has very high cell transfection efficiency.

Figure 8:
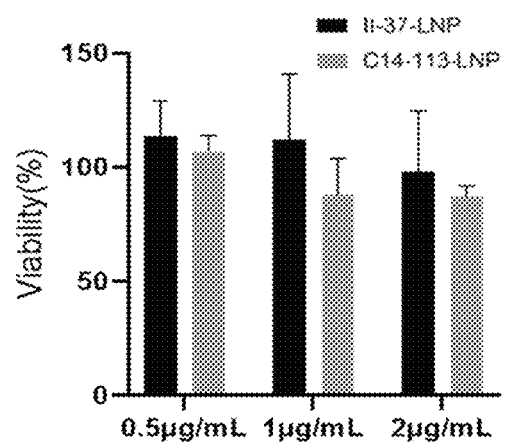
FIG. 8 shows the cytotoxicity of II-37-LNP and C14-113-LNP determined by MTT method.

In addition, the cytotoxicity of II-37-LNP and C14-113-LNP was determined by MTT method, and the effect of factors such as vector dosage and action time on the proliferation of normal cells (293T cells) was examined. The results are shown in FIG. 8. 48 h after the transfection of cells, the lipid nanoparticle prepared from II-37 (shown as II-37-LNP in the figure) carrying mRNA still maintained relatively good cell activity at a higher dose (2 μg/mL), indicating that the cytotoxicity of the lipid nanoparticle prepared from II-37 is very low.

It can be seen from the results in Example 7 that the lipid nanoparticles prepared by the combination of the novel lipid compound have low cytotoxicity and are superior to the structural analog molecule C14-113 in mRNA transfection efficiency.

The embodiments of the present invention have been described above. However, the present invention is not

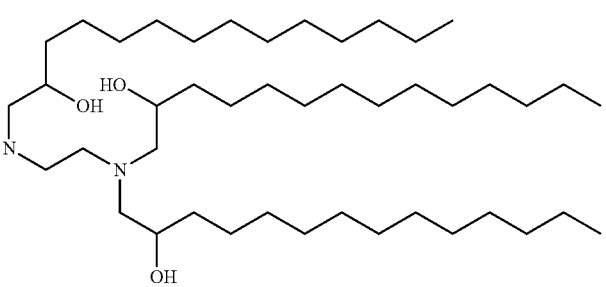

limited to the embodiments described above. Any modification, equivalent, improvement, and the like made without departing from the spirit and principle of the present invention shall fall within the protection scope of the present invention.

The invention claimed is:
1. A compound having a structure

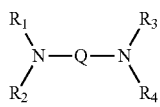
(I)

of formula I, wherein:
Q is

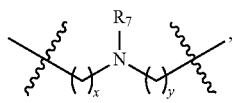

wherein x and y are 2; $R_7$ is methyl;
$R_1$, $R_2$, $R_3$, and $R_4$ are identical or different and are each independently hydrogen or

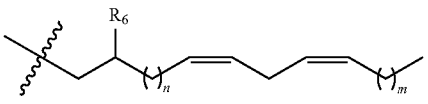

with the proviso that at least two of $R_1$, $R_2$, $R_3$, and $R_4$ are

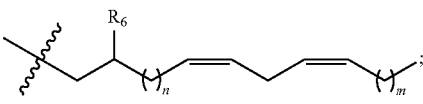;

$R_6$ is —OH;
n is selected from integers from 1 to 8, m is selected from integers from 0 to 8, and n and m are the same or different.

2. The compound according to claim 1, wherein n is selected from integers from 4 to 8, and m is selected from integers from 4 to 8.

3. The compound according to claim 1, wherein the compound is selected from compounds of formulae A, B, C, and D:

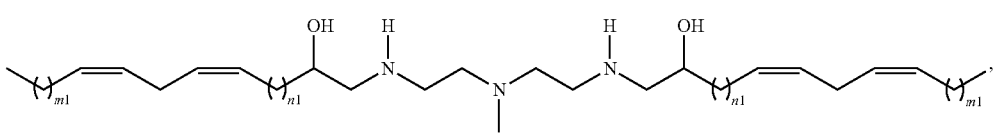
A wherein each $n_1$ is independent and is identical or different, and each $n_1$ is selected from integers from 1 to 8; each $m_1$ is independent and is identical or different, and each $m_1$ is selected from integers from 0 to 8;

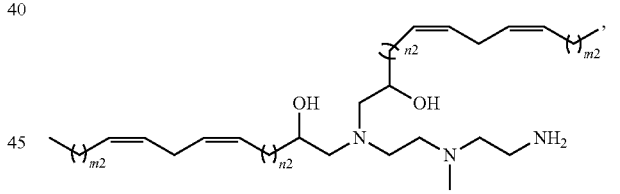
B wherein each $n_2$ is independent and is identical or different, and each $n_2$ is selected from integers from 1 to 8; each $m_2$ is independent and is identical or different, and each $m_2$ is selected from integers from 0 to 8;

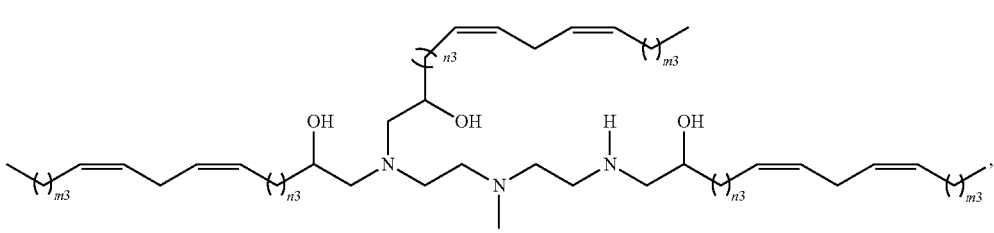
C wherein each $n_3$ is independent and is identical or different, and each $n_3$ is selected from integers from 1 to 8; each $m_3$ is independent and is identical or different, and each $m_3$ is selected from integers from 0 to 8; and

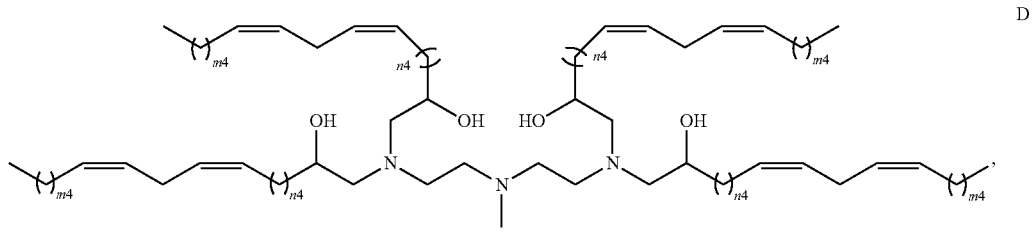

D wherein each $n_4$ is independent and is identical or different, and each $n_4$ is selected from integers from 1 to 8; each $m_4$ is independent and is identical or different, and each $m_4$ is selected from integers from 0 to 8.

4. The compound according to claim 3, wherein each $n_1$ is selected from integers from 4 to 8, and each $m_1$ is selected from integers from 4 to 8; or, each $n_2$ is selected from integers from 4 to 8, and each $m_2$ is selected from integers from 4 to 8; or, each $n_3$ is selected from integers from 4 to 8, and each $m_3$ is selected from integers from 4 to 8; or, each $n_4$ is selected from integers from 4 to 8, and each $m_4$ is selected from integers from 4 to 8.

5. The compound according to claim 1, wherein the compound is

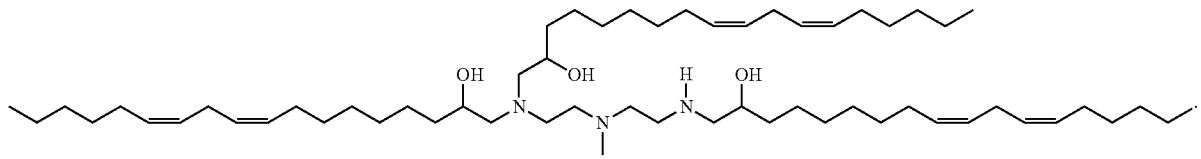

6. A bioactive substance delivery system comprising the compound according to claim 1, the delivery system is microparticles, nanoparticles, liposomes, lipid nanoparticles, or microbubbles.

7. A pharmaceutical composition comprising the bioactive substance delivery system according to claim 6.

* * * * *